US012696145B2

(12) United States Patent
Je et al.

(10) Patent No.: US 12,696,145 B2
(45) Date of Patent: Jul. 28, 2026

(54) METHOD FOR AUTHENTICATING ACCESS LAYER ON BASIS OF PUBLIC KEY INFRASTRUCTURE IN CONSIDERATION OF HANDOVER IN NEXT-GENERATION WIRELESS COMMUNICATION SYSTEM

(71) Applicant: Samsung Electronics Co., Ltd., Gyeonggi-do (KR)

(72) Inventors: Donghyun Je, Gyeonggi-do (KR); Jungsoo Jung, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 474 days.

(21) Appl. No.: 18/035,357

(22) PCT Filed: Dec. 13, 2021

(86) PCT No.: PCT/KR2021/018879
§ 371 (c)(1),
(2) Date: May 4, 2023

(87) PCT Pub. No.: WO2022/131719
PCT Pub. Date: Jun. 23, 2022

(65) Prior Publication Data
US 2023/0422106 A1 Dec. 28, 2023

(30) Foreign Application Priority Data
Dec. 14, 2020 (KR) ........................ 10-2020-0174228

(51) Int. Cl.
*H04W 36/00* (2009.01)
*H04W 12/06* (2021.01)
*H04W 36/08* (2009.01)
(52) U.S. Cl.
CPC ....... *H04W 36/0038* (2013.01); *H04W 12/06* (2013.01); *H04W 36/0058* (2018.08); *H04W 36/08* (2013.01)

(58) Field of Classification Search
CPC ............. H04W 36/0038; H04W 12/06; H04W 36/0058; H04W 36/08; H04W 12/03;
(Continued)

(56) References Cited

U.S. PATENT DOCUMENTS 10,412,583 B2      9/2019   Vanderveen
11,140,585 B2 *   10/2021   Xu .................... H04W 36/0058
(Continued)

FOREIGN PATENT DOCUMENTS

CN      101902476      12/2010
CN      109716809      5/2019
(Continued)

OTHER PUBLICATIONS

PCT/ISA/210 Search Report issued on PCT/KR2021/018879, dated Mar. 21, 2022, pp. 7.
(Continued)

*Primary Examiner* — Brandon J Miller
(74) *Attorney, Agent, or Firm* — The Farrell Law Firm, P.C.

(57) ABSTRACT

The present disclosure relates to a 5G or 6G communication system for supporting higher data transmission rates than 4G communication systems such as LTE. In a wireless communication system according to an embodiment of the present invention, an operation method of a serving base station for mutual authentication in an access stratum (AS) section during handover comprises the steps of: receiving a measurement report from a terminal; confirming whether the terminal meets handover conditions on the basis of the measurement report; if the terminal meets the handover conditions, confirming whether a target base station, to which the terminal is to be connected during handover, belongs to the same authentication area (AA) as the serving base station; and transmitting, to the terminal, a handover (Continued)

command that is configured differently according to whether the target base station and the serving base station belong to the same AA.

12 Claims, 34 Drawing Sheets

(58) Field of Classification Search
CPC ....... H04W 36/008357; H04W 12/069; H04W 12/04
See application file for complete search history.

(56) References Cited

U.S. PATENT DOCUMENTS

| | | | |
|---|---|---|---|
| 2009/0086676 A1* | 4/2009 | Meylan | H04W 36/08 |
| | | | 370/331 |
| 2009/0201881 A1 | 8/2009 | Chun et al. | |
| 2010/0172500 A1 | 7/2010 | Wu | |
| 2011/0078442 A1* | 3/2011 | Gong | H04L 63/0823 |
| | | | 713/168 |
| 2012/0082315 A1 | 4/2012 | Bai et al. | |
| 2013/0059564 A1 | 3/2013 | Jung et al. | |
| 2016/0219039 A1 | 7/2016 | Houthooft et al. | |
| 2018/0091485 A1 | 3/2018 | Lee et al. | |
| 2018/0262329 A1 | 9/2018 | Nix | |
| 2019/0037454 A1 | 1/2019 | Lee et al. | |
| 2019/0082367 A1 | 3/2019 | Lin et al. | |
| 2020/0067702 A1 | 2/2020 | Xiong et al. | |
| 2020/0162988 A1* | 5/2020 | Zeng | H04W 76/27 |
| 2020/0351256 A1* | 11/2020 | Lee | H04L 63/0428 |

FOREIGN PATENT DOCUMENTS

| | | |
|---|---|---|
| CN | 110769417 | 2/2020 |
| EP | 3591891 | 1/2020 |
| KR | 10-2011-0069673 | 6/2011 |
| KR | 10-1550464 | 9/2015 |

OTHER PUBLICATIONS

PCT/ISA/237 Written Opinion issued on PCT/KR2021/018879, dated Mar. 21, 2022, pp. 5.
3GPP; TSG SA; Security architecture and procedures for 5G system (Release 16), 3GPP TS 33.501 V16.4.0 (Sep. 2020). Sep. 25, 2020.
European Search Report dated Mar. 18, 2024 issued in counterpart application No. 21907023.2-1216, 9 pages.
Chinese Office Action dated Jul. 7, 2025 issued in counterpart application No. 202180084058.7, 12 pages.
Chinese Office Action dated Jan. 6, 2026 issued in counterpart application No. 202180084058.7, 8 pages.
Korean Office Action dated Jan. 27, 2026 issued in counterpart application No. 10-2020-0174228, 11 pages.

* cited by examiner

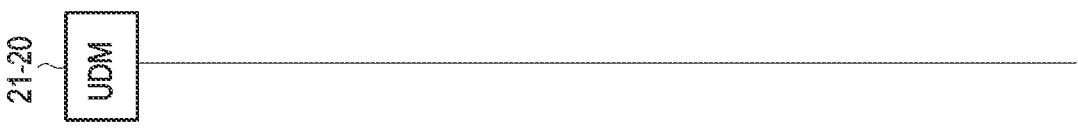

FIG. 21A 21-20
UDM 21-15
RAN 21-10
UE 21-30
Authentication Request(6G Identifier)

21-40
Auth-Req. (
EAP Request/EAP-Type = EAP-TLS
(TLS Start), 6G_KSI, ABBA)

21-50
Auth-Resp. (
EAP Response/EAP-Type = EAP-TLS
(TLS client_hello))

21-60
Auth-Req.(
EAP Request/EAP-Type = EAP-TLS
(TLS RAN_hello,
TLS Certificate,
[TLS RAN_key_exchange,]
TLS certificate_request,
TLS RAN_hello_done ), 6G_KSI, ABBA)

21-70
UE temporary authenticate
RAN 21-80
Auth-Resp.(
EAP Response/EAP-Type = EAP-TLS
(TLS Certificate,
TLS client_key_exchange,
TLS certificate_verify,
TLS change_cipher_spec,
TLS finished ))

METHOD FOR AUTHENTICATING ACCESS LAYER ON BASIS OF PUBLIC KEY INFRASTRUCTURE IN CONSIDERATION OF HANDOVER IN NEXT-GENERATION WIRELESS COMMUNICATION SYSTEM

CROSS-REFERENCE TO RELATED APPLICATIONS

This application is a U.S. National Phase Entry of PCT International Application No. PCT/KR2021/018879, which was filed on Dec. 13, 2021, and claims priority to Korean Patent Application No. 10-2020-0174228, which was filed on Dec. 14, 2020, the entire disclosure of each of which is incorporated herein by reference.

TECHNICAL FIELD

The disclosure relates to a method and an apparatus for performing mutual authentication between a UE and a BS on the basis of public key infrastructure (PKI) when a wireless device is handed over in a next-generation mobile communication system.

BACKGROUND ART

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the $\frac{1}{10}$ radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collison avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

DETAILED DESCRIPTION OF THE INVENTION

Technical Problem

The disclosure provides a method and an apparatus for performing public key infrastructure (PKI)-based authentication in an access stratum (AS) section between a UE and a BS during handover in a mobile communication system.

Technical Solution

A method of operating a serving base station (BS) for mutual authentication of an access stratum (AS) section in case that handover is performed in a wireless communication system according to an embodiment of the disclosure includes receiving a measurement report from a user equipment (UE), identifying whether a handover condition by the UE, based on the measurement report, in case that the UE satisfies the handover condition, identifying whether a target BS connected when the UE is handed over belongs to a same authentication area (AA) as that of the serving BS, and transmitting a handover command varying depending on whether the target BS and the serving BS belong to the same AA to the UE.

According to an embodiment, the handover command may include intra-AA handover information in case that the target BS and the serving BS belong to the same AA, and the handover command may include inter-AA handover information in case that the target BS and the serving BS do not belong to the same AA.

According to an embodiment, public key infrastructure (PKI)-based mutual authentication between the UE and the target BS may not be performed and a key update procedure for the target BS may be performed by the UE in case that the intra-AA handover information is transmitted, and the PKI-based mutual authentication between the UE and the target BS may be performed in case that the inter-AA handover information is transmitted.

According to an embodiment, the AA may be a set of cells served by a physically or logically same computing node.

According to an embodiment, the same computing node may be a logically or physically same computing node, the logically same computing node may be implemented as software of an same operator, software having an same right, or software performing an same process, and the physically same computing node may be implemented as hardware of an same operator, hardware having an same right, or an same hardware component.

According to an embodiment, in case that the inter-AA handover information is received, the UE and the serving BS may detach from each other and then the PKI-based mutual authentication between the UE and the target BS may be performed.

According to another embodiment, in case that the inter-AA handover information is transmitted, the PKI-based mutual authentication between the UE and the target BS may be performed, and the serving BS may forward a PKI-based authentication packet to the target BS.

According to another embodiment, in case that the inter-AA handover information is transmitted, the PKI-based mutual authentication between the UE and the target BS may be performed, the serving BS may transmit a PKI-based authentication packet to a network entity, and the PKI-based authentication packet may be transferred to the target BS by the network entity.

A method of operating a user equipment (UE) for mutual authentication of an access stratum (AS) section in case that handover is performed in a wireless communication system according to an embodiment of the disclosure includes receiving a handover command varying depending on whether a target base station (BS) connected when the UE is handed over belongs to a same authentication area (AA) as that of a serving BS from the serving BS, and determining whether to perform public key infrastructure (PKI)-based mutual authentication with the target BS, based on information included in the handover command.

According to an embodiment, the handover command may include intra-AA handover information in case that the target BS and the serving BS belong to the same AA, and the handover command may include inter-AA handover information in case that the target BS and the serving BS do not belong to the same AA.

According to an embodiment, public key infrastructure (PKI)-based mutual authentication between the UE and the target BS may not be performed and a key update procedure for the target BS may be performed by the UE in case that the intra-AA handover information is received, and the PKI-based mutual authentication between the UE and the target BS may be performed in case that the inter-AA handover information is received.

According to an embodiment, the AA may be a set of cells served by a physically or logically same computing node.

According to an embodiment, in case that the inter-AA handover information is received, the UE may detach from the serving BS and then the PKI-based mutual authentication between the UE and the target BS may be performed.

According to another embodiment, in case that the inter-AA handover information is received, the UE may perform the PKI-based mutual authentication with the target BS and the serving BS may forward a PKI-based authentication packet to the target BS.

According to another embodiment, in case that the inter-AA handover information is received, the UE may perform the PKI-based mutual authentication with the target BS, the serving BS may transmit the PKI-based authentication packet to a network entity, and the network entity may forward the PKI-based authentication packet to the target BS.

A serving base station (BS) supporting mutual authentication of an access stratum (AS) section in case that handover is performed in a wireless communication system includes a transceiver and a controller connected to the transceiver and configured to control the transceiver and perform control to receive a measurement report from a user equipment (UE), identify whether the UE satisfies the handover condition, based on the measurement report, in case that the UE satisfies the handover condition, identify whether a target BS connected when the UE is handed over belongs to a same authentication area (AA) as that of the serving BS, and transmit a handover command varying depending on whether the target BS and the serving BS belong to the same AA to the UE.

A user equipment (UE) for mutual authentication of an access stratum (AS) section in case that handover is performed in a wireless communication system includes a transceiver and a controller connected to the transceiver and configured to control the transceiver and perform control to receive a handover command varying depending on whether a target base station (BS) connected when the UE is handed over belongs to a same authentication area (AA) as that of a serving BS from the serving BS and determine whether to perform public key infrastructure (PKI)-based mutual authentication with the target BS, based on information included in the handover command.

An embodiment of the disclosure provides a method and an apparatus for performing mutual authentication between a wireless device and a BS in handover when the wireless device performs public key infrastructure (PKI)-based authentication in access stratum (AS) section in a mobile communication system.

A serving BS transmits a command to the UE when handover is performed. The UE receives the information and performs authentication when authentication with the target BS is needed. The UE completes authentication with the target BS and use the generated key as a key for inducing an encryption key between the BS and the UE.

During the process, the serving BS may transmit information including information indicating whether authentication with the target BS is needed when the UE is handed over.

The UE may perform authentication with a predetermined BS before a handover command.

The serving BS may indicate authentication with the predetermined BS to the UE before the handover.

The target BS may allow or reject the authentication according to its own determination in response to an authentication request from the serving BS or an authentication request from the UE.

Advantageous Effects

According to the disclosure, it is possible to enhance security of wireless communication between a UE and a BS through public key infrastructure (PKI)-based access stratum (AS) section authentication when the UE is handed over from a serving BS to another BS in a wireless communication system.

6

Figure 19A:
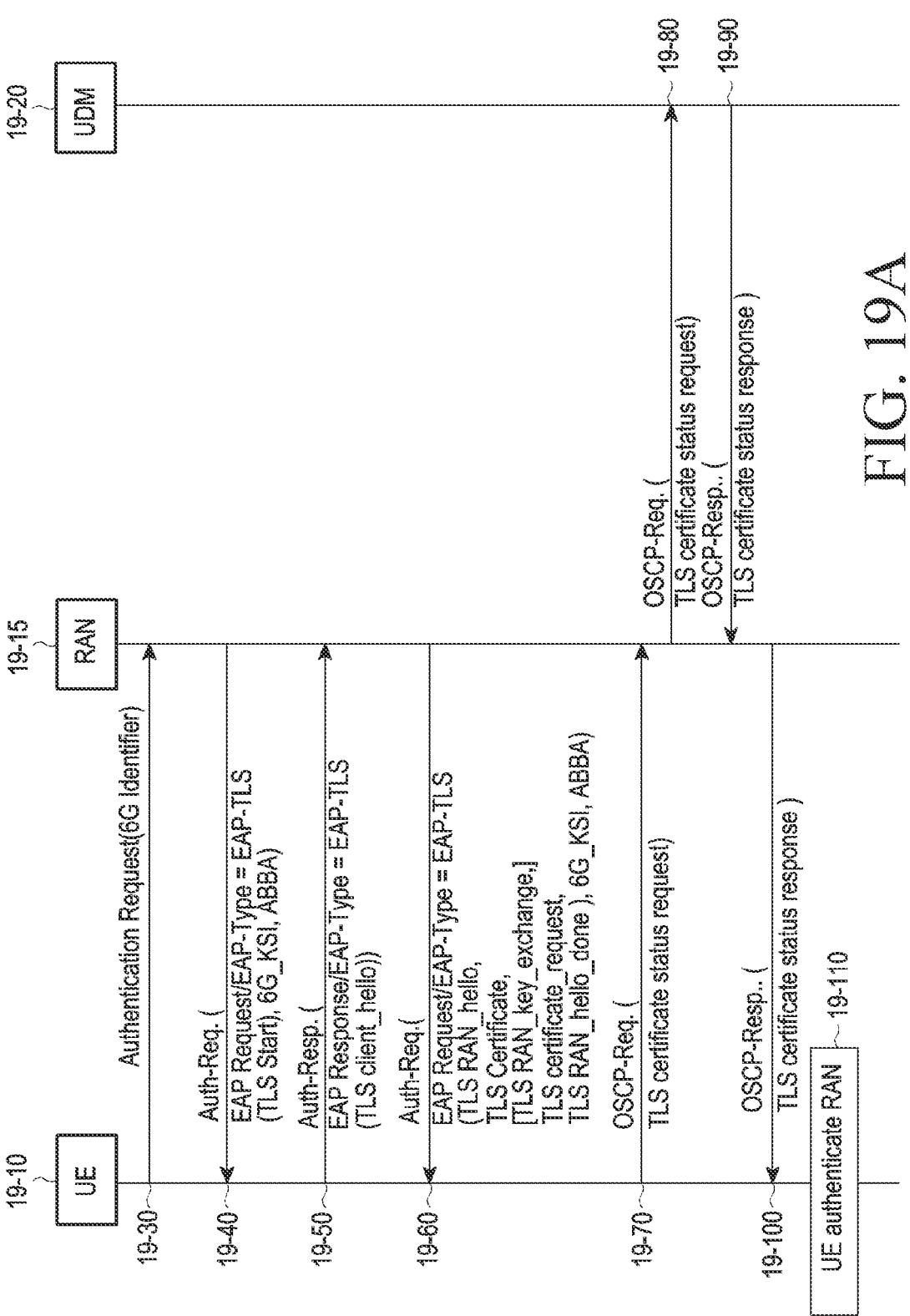
Figure 19B:
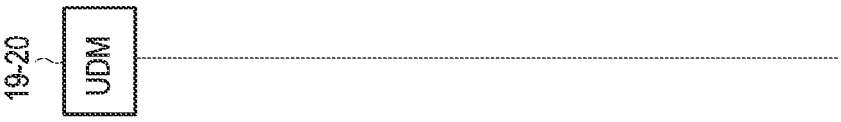
Figure 19B:
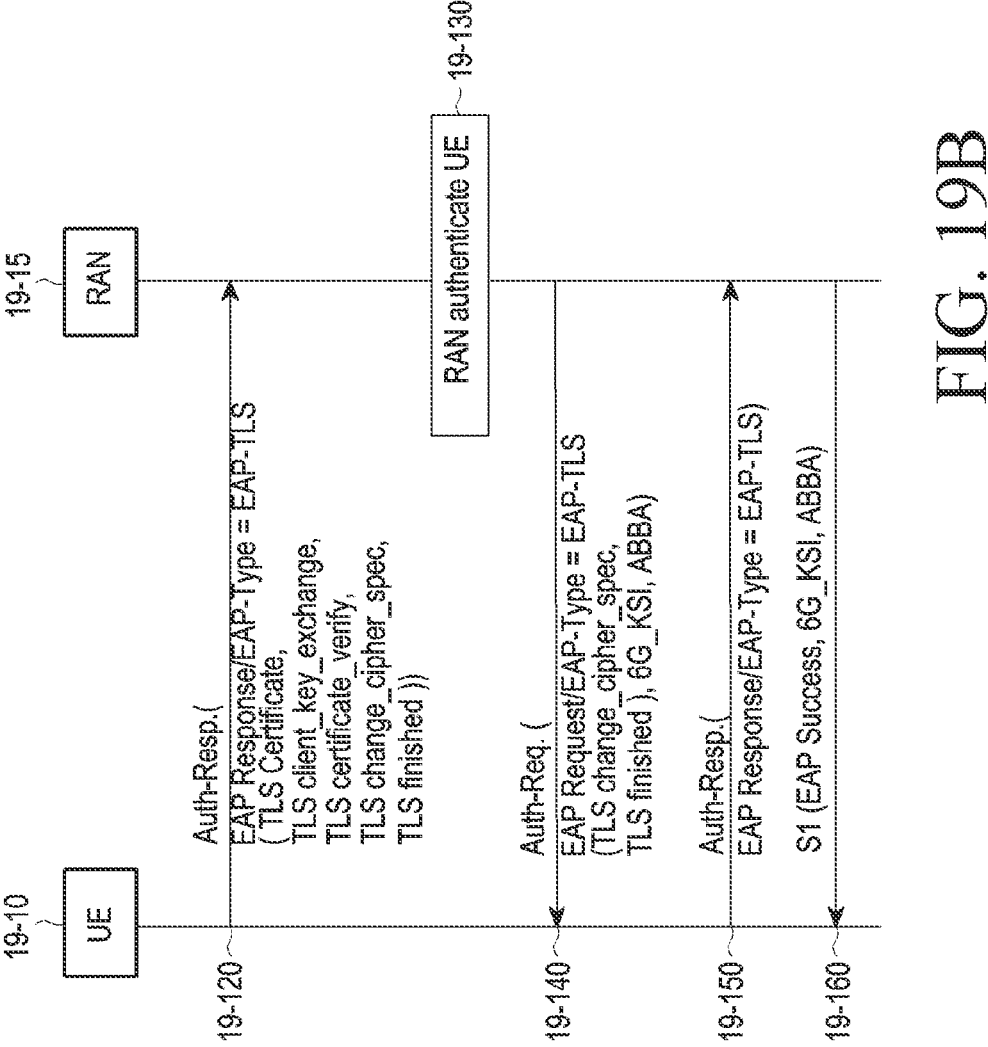

FIGS. 19A and 19B illustrate the a procedure in which validity of a certificate is identified when the UE performs PKI-based authentication with the RAN according to another embodiment of the disclosure.

Figure 20A:
Figure 20A:
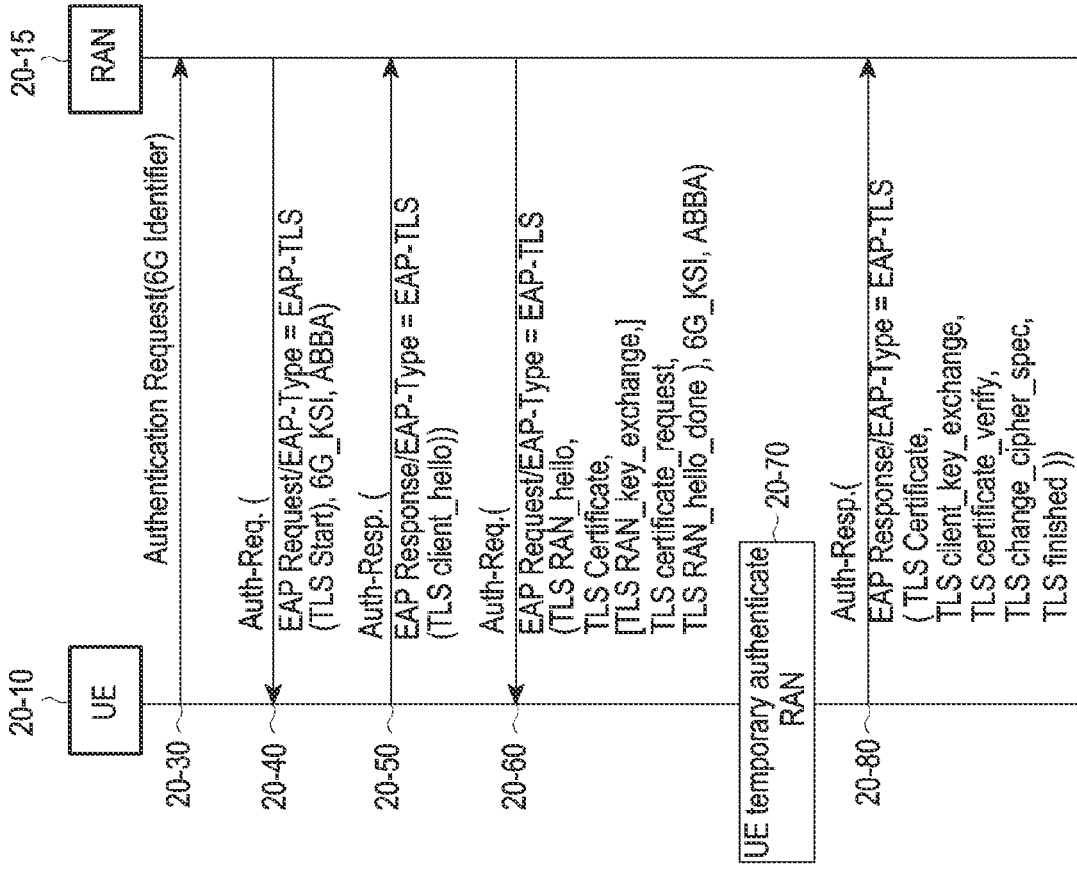
Figure 20B:
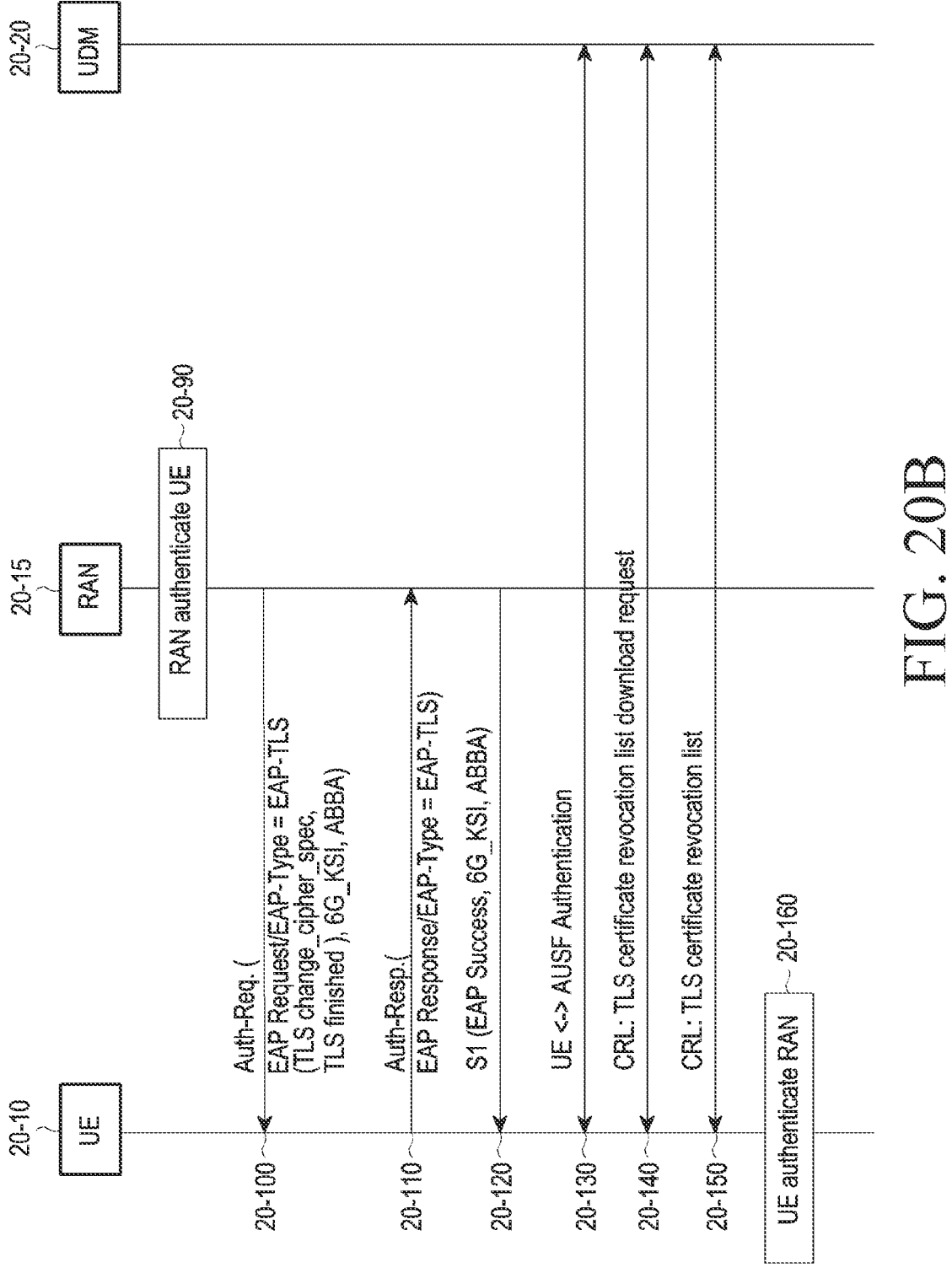

FIGS. 20A and 20B illustrate the procedure in which validity of the certificate is identified when the UE and the RAN perform PKI-based authentication according to another embodiment of the disclosure.

Figure 21B:
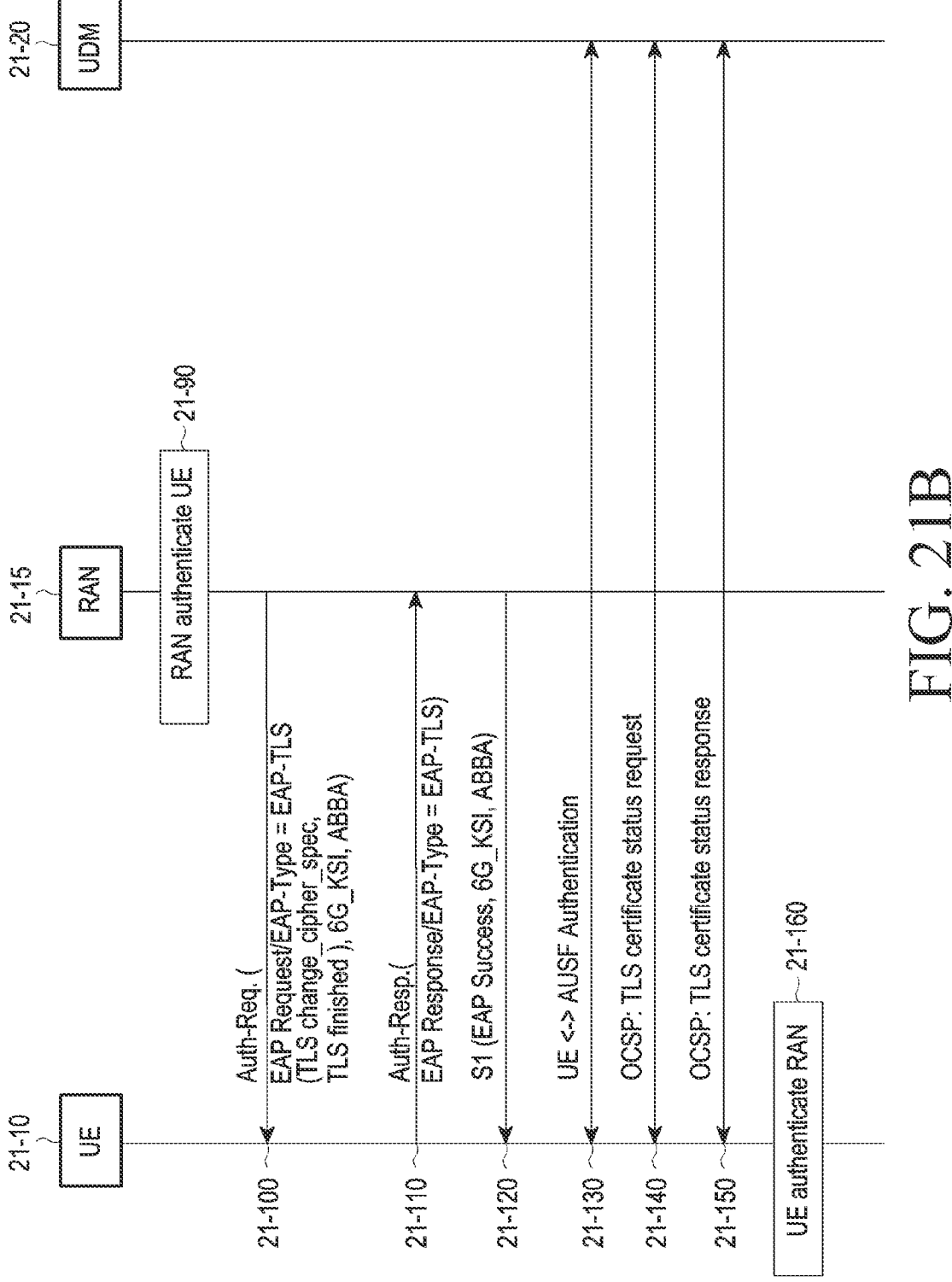

FIGS. 21A and 21B illustrate the procedure in which validity of the certificate is identified when the UE and the RAN perform PKI-based authentication according to another embodiment of the disclosure.

Figure 22:
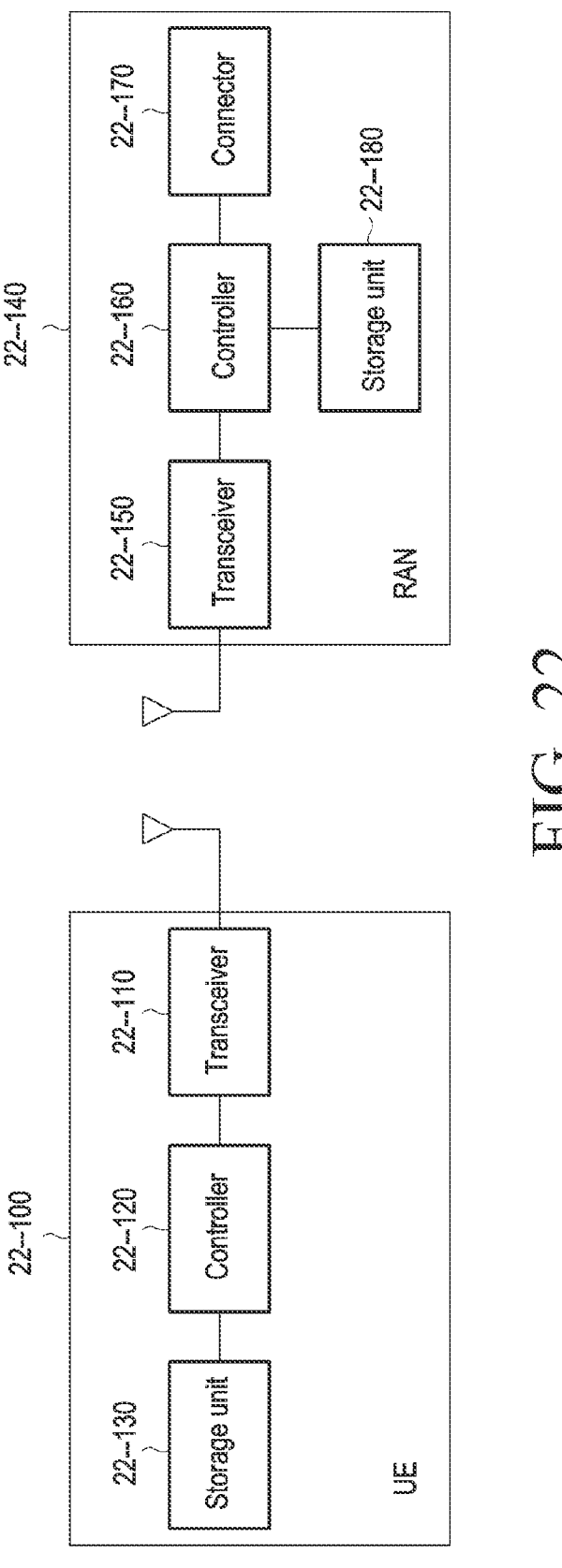

FIG. 22 is a block diagram illustrating apparatuses of the UE and the BS according to an embodiment of the disclosure.

MODE FOR CARRYING OUT THE INVENTION

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 5G, NR, and LTE system standards for the convenience of description. However, the disclosure is not limited by these terms and names, and may be applied in the same way to systems that conform other standards.

That is, the following detailed description of embodiments of the disclosure will be mainly directed to the communication standards defined by 3GPP. However, based on determinations by those skilled in the art, the main idea of the disclosure may also be applied to other communication systems having similar technical backgrounds through some modifications without significantly departing from the scope of the disclosure.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) (or a mobile station (MS)) transmits data or control signals to a base station (BS) (generation Node B (gNB) or eNode B (eNB)), and the downlink indicates a radio link through which the base station transmits data or control signals to the UE. The above multiple access scheme separates data or control information of respective users by allocating and operating time-frequency resources for transmitting the data or control information for each user so as to avoid overlapping each other, that is, so as to establish orthogonality.

Since a post-LTE communication system, that is, 5G communication system must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and requires a very long battery life-time such as 10 to 15 years because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10-5 or less. Therefore, for the services supporting URLLC, a 5G system must provide a transmit time interval (TTI) shorter than those of other services, and also requires a design for assigning a large number of resources in a frequency band in order to secure reliability of a communication link.

The three services in the 5G communication system, that is, eMBB, URLLC, and mMTC, may be multiplexed and transmitted in a single system. In this case, different transmission/reception techniques and transmission/reception parameters may be used between services in order to satisfy different requirements of the respective services.

Moreover, further evolved services, such as mobile hologram, virtual reality, and augmented reality, are emerging in communications. To support these services, element technologies, such as artificial intelligence (AI) technology, sensing technology, wired/wireless communication and network infrastructures, service interface technology, and security technology, are being studied in communication systems.

Figure 1:
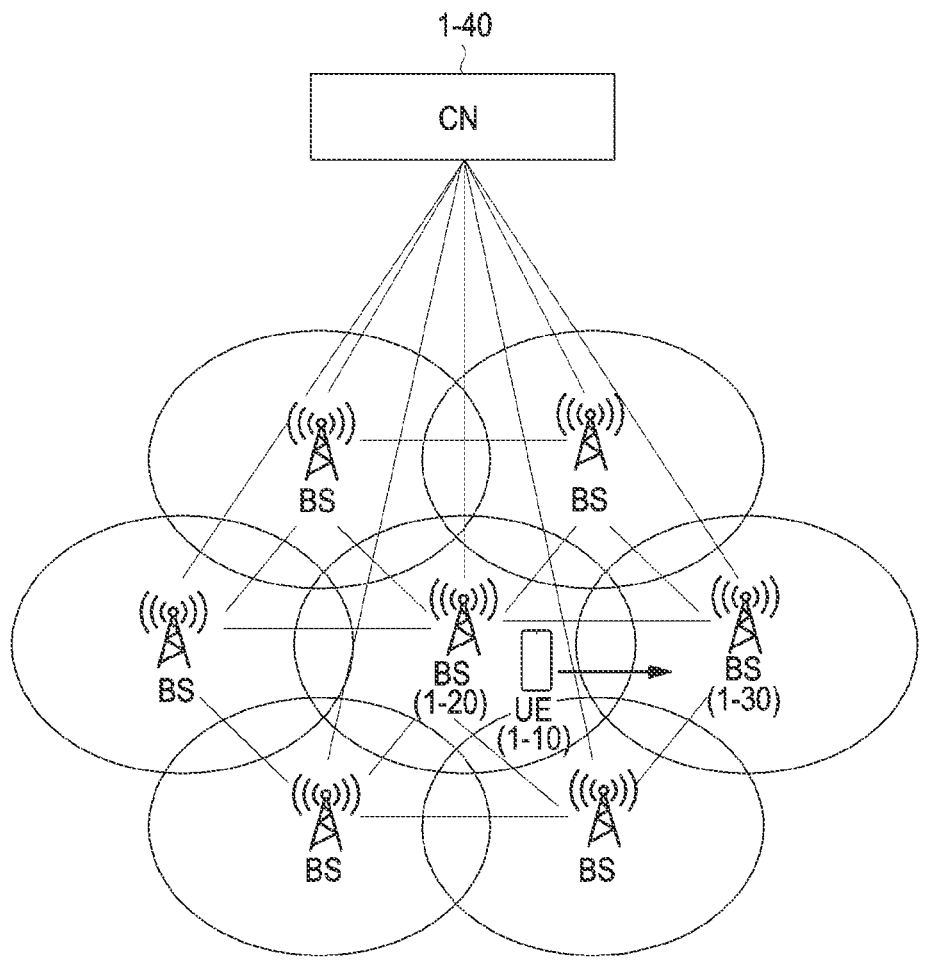
FIG. 1 illustrates a structure of an LTE system according to an embodiment of the disclosure.

FIG. 1 illustrates a structure of an LTE system according to an embodiment of the disclosure.

FIG. 1 illustrates an example in which a plurality of base stations (BSs) and a user equipment (UE) move and a connected BS is changed in a mobile communication system to which embodiments of the disclosure are applied.

BSs 1-20 and 1-30 may be connected to some of neighbor BSs and may also be connected to a mobile communication core network (CN) 1-40 such as an evolved packet core (EPC) or a 5G core network (5GC).

The radio access technology of the BSs 1-20 and 1-30 may be LTE, NR, WiFi, or the like, but is not limited thereto. For example, the BSs 1-20 and 1-30 may be mobile communication BSs irrelevant to the radio access technology.

A UE 1-10 may be connected to the BS to receive a mobile communication service, may be connected to a different BS according to movement of the UE 1-10, and may continuously receive a mobile communication service through a handover (HO or handoff) procedure. In the example of FIG. 1, the UE 1-10 having been connected to the BS 1-20 may be disconnected from the BS 1-20 and may be connected to the new BS 1-30.

Figure 2:
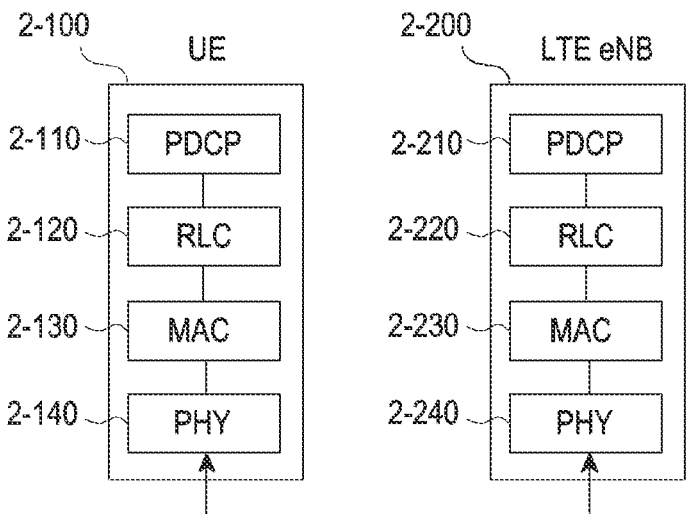
FIG. 2 illustrates a radio protocol structure in the LTE system according to an embodiment of the disclosure.

FIG. 2 illustrates a radio protocol structure in the LTE system according to an embodiment of the disclosure.

Referring to FIG. 2, a UE 2-100 and an LTE eNB 2-200 include packet data convergence protocols (PDCPs) 2-110 and 2-210, radio link controls (RLCs) 2-120 and 2-220, medium access controls (MACs) 2-130 and 2-230, respectively, in the radio protocol of the LTE system. Elements of the radio protocol may be referred to as layers, entities, or devices.

The packet data convergence protocols (PDCPs) 2-110 and 2-210 perform an operation of compressing/reconstructing an IP header. Main functions of the PDCP are described below.

Header compression and decompression function (Header compression and decompression: ROHC only)

User data transmission function (Transfer of user data)

Sequential delivery function (In-sequence delivery of upper layer PDUs at PDCP re-establishment procedure for RLC AM)

Sequence re-arrangement function (For split bearers in DC (only support for RLC AM): PDCP PDU routing for transmission and PDCP PDU reordering for reception)

Duplicate detection function (Duplicate detection of lower layer Service Data Units (SDUs) at PDCP re-establishment procedure for RLC AM)

Retransmission function (Retransmission of PDCP SDUs at handover and, for split bearers in DC, of PDCP PDUs at PDCP data-recovery procedure, for RLC AM)

Ciphering and deciphering function (Ciphering and deciphering)

Timer-based SDU removal function (Timer-based SDU discard in uplink)

Radio Link Controls (RLCs) 2-120 and 2-220 reconfigure the PDCP packet data unit (PDU) to be the proper size and performs an ARQ operation. Main functions of the RLC are described below.

Data transmission function (Transfer of upper layer PDUs)

ARQ function (Error Correction through ARQ (only for AM data transfer))

Concatenation, segmentation, and reassembly function (Concatenation, segmentation, and reassembly of RLC SDUs (only for UM and AM data transfer))

Re-segmentation function (Re-segmentation of RLC data PDUs (only for AM data transfer))

Reordering function (Reordering of RLC data PDUs (only for UM and AM data transfer)

Duplication detection function (only for UM and AM data transfer))

Error detection function (Protocol error detection (only for AM data transfer))

RLC SDU deletion function (RLC SDU discard (only for UM and AM data transfer))

RLC re-establishment function (RLC re-establishment)

The MACs 2-130 and 2-230 are connected with various RLC layer devices included in one UE, and perform an operation for multiplexing RLC PDUs to the MAC PDU and demultiplexing the RLC PDUs from the MAC PDU. Main functions of the MAC are described below.

Mapping function (Mapping between logical channels and transport channels)

Multiplexing and demultiplexing function (Multiplexing/demultiplexing of MAC SDUs belonging to one or different logical channels into/from Transport Blocks (TB) delivered to/from the physical layer on transport channels)

Scheduling information report function (Scheduling information reporting)

HARQ function (Error correction through HARQ)

Logical channel priority control function (Priority handling between logical channels of one UE)

UE priority control function (Priority handling between UEs by means of dynamic scheduling)

MBMS service identification function (MBMS service identification)

Transport format selection function (Transport format selection)

Padding function (Padding)

The physical layers 2-140 and 2-240 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 3:
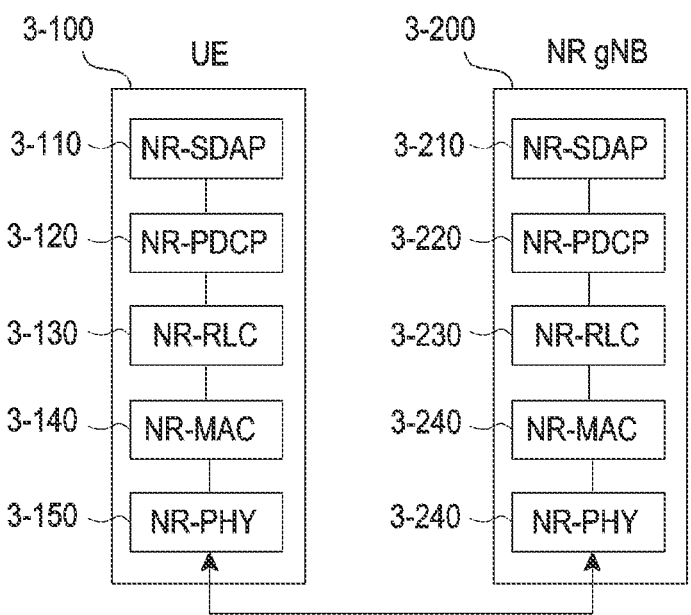
FIG. 3 illustrates a radio protocol structure in a next-generation mobile communication system according to an embodiment of the disclosure.

FIG. 3 illustrates a structure of a radio protocol in a next-generation mobile communication system according to an embodiment of the disclosure.

Referring to FIG. 3, a UE 3-100 and an NR gNB 3-200 include NR service data application protocols (SDAPs) 3-110 and 3-210, NR PDCPs 3-120 and 3-220, NR RLCs 3-130 and 3-230, and NR MACs 3-140 and 3-240, respectively, in the radio protocol of the next-generation mobile communication system includes. Elements of the radio protocol may be referred to as layers, entities, or devices.

Main functions of the NR SDAPs 3-110 and 3-210 may include some of the following functions.

User data transmission function (transfer of user-plane data)

Function of mapping QoS flow and a data bearer for uplink and downlink (mapping between a QoS flow and a DRB for both DL and UL)

Function of marking a QoS flow ID for uplink and downlink (marking QoS flow ID in both DL and UL packets)

Function of mapping reflective QoS flow to a data bearer for uplink SDAP PDUs (reflective QoS flow to DRB mapping for the UL SDAP PDUs)

With respect to the SDAP layer device, the UE may receive a configuration as to whether to use a header of the SDAP layer device or a function of the SDAP layer device for each PDCP layer device, each bearer, or each logical channel through an RRC message. If the SDAP header is configured, a 1-bit indicator of NAS reflective QoS of the SDAP header and a 1 bit-indicator of AS reflective QoS may indicate that the UE updates or reconfigures information on mapping of QoS flow and a data bearer in uplink and downlink. The SDAP header may include QoS flow ID information indicating the QoS. The QoS information may be used as a data processing priority and scheduling information for smoothly supporting the service.

Main functions of the NR PDCPs 3-120 and 3-220 may include some of the following functions.

Header compression and decompression function (header compression and decompression: ROHC only)

User data transmission function (Transfer of user data)

Sequential delivery function (In-sequence delivery of upper layer PDUs)

Non-sequential delivery function (Out-of-sequence delivery of upper layer PDUs)

Reordering function (PDCP PDU reordering for reception)

Duplicate detection function (Duplicate detection of lower layer SDUs)

Retransmission function (Retransmission of PDCP SDUs)

Ciphering and deciphering function (Ciphering and deciphering)

Timer-based SDU removal function (Timer-based SDU discard in uplink)

The reordering function of the NR PDCP device is a function of sequentially reordering PDCP PDUs received by a lower layer on the basis of a PDCP sequence number (SN), and may include a function of sequentially transferring the reordered data to a higher layer, a function of directly transmitting the recorded data without consideration of the sequence, a function of recording PDCP PDUs lost due to the reordering, a function of reporting statuses of the lost PDCP PDUs to a transmitting side, and a function of making a request for retransmitting the lost PDCP PDUs.

Main functions of the NR RLCs 3-130 and 3-230 may include some of the following functions.

Data transmission function (Transfer of upper layer PDUs)

Sequential delivery function (In-sequence delivery of upper layer PDUs)

Non-sequential delivery function (Out-of-sequence delivery of upper layer PDUs)

ARQ function (Error correction through ARQ)

Concatenation, segmentation, and reassembly function (Concatenation, segmentation, and reassembly of RLC SDUs)

Re-segmentation function (Re-segmentation of RLC data PDUs)

Reordering function (Reordering of RLC data PDUs)

Duplicate detection function (Duplicate detection)

Error detection function (Protocol error detection)

RLC SDU deletion function (RLC SDU discard)

RLC re-establishment function (RLC re-establishment)

The sequential delivery function (In-sequence delivery) of the NR RLC device is a function of sequentially transferring PDCP PDUs received from a lower layer to a higher layer, and may include, when one original RLC SDU is divided into a plurality of RLC SDUs and then received, a function of reassembling and transmitting the RLC SDUs, a function of reordering the received RLC PDUs on the basis of an RLC sequence number (SN) or a PDCP SN, a function of recording PDCP PDUs lost due to the reordering, a function of reporting statuses of the lost PDCP PDUs to a transmitting side, a function of making a request for retransmitting the lost PDCP PDUs, if there is a lost RLC SDU, a function of sequentially transferring only RLC SDUs preceding the lost RLC SDU to the higher layer, if a predetermined timer expires even though there is a lost RLC SDU, a function of sequentially transferring all RLC SDUs received before the timer starts to the higher layer, or if a predetermined timer expires even though there is a lost RLC SDU, a function of sequentially transferring all RLC SDUs received up to that point in time to the higher layer.

Further, the NR RLC device may process the RLC PDUs sequentially in a reception order thereof (according to an arrival order regardless of a serial number or an SN) and may transfer the RLC PDUs to the PDCP device regardless of the sequence thereof (out-of-sequence delivery). If the received RLC SDU is a segment, the NR RLC device may receive segments which are stored in the buffer or will be received in the future, reconfigure the segments to be one complete RLC PDU, process the RLC PDU, and then transmit the same to the PDCP device. The NR RLC layer may not include a concatenation function, and the function may be performed by the NR MAC layer, or may be replaced with a multiplexing function of the NR MAC layer.

The non-sequential function (out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs 3-140 and 3-240 may be connected to a plurality of NR RLC layer devices configured in one UE and main functions of the NR MAC may include some of the following functions.

Mapping function (Mapping between logical channels and transport channels)

Multiplexing and demultiplexing function (Multiplexing/demultiplexing of MAC SDUs)

Scheduling information report function (Scheduling information reporting)

HARQ function (Error correction through HARQ)

Logical channel priority control function (Priority handling between logical channels of one UE)

UE priority control function (Priority handling between UEs by means of dynamic scheduling)

MBMS service identification function (MBMS service identification)

Transport format selection function (Transport format selection)

Padding function (Padding)

The NR PHY layers 3-150 and 3-250 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 4:
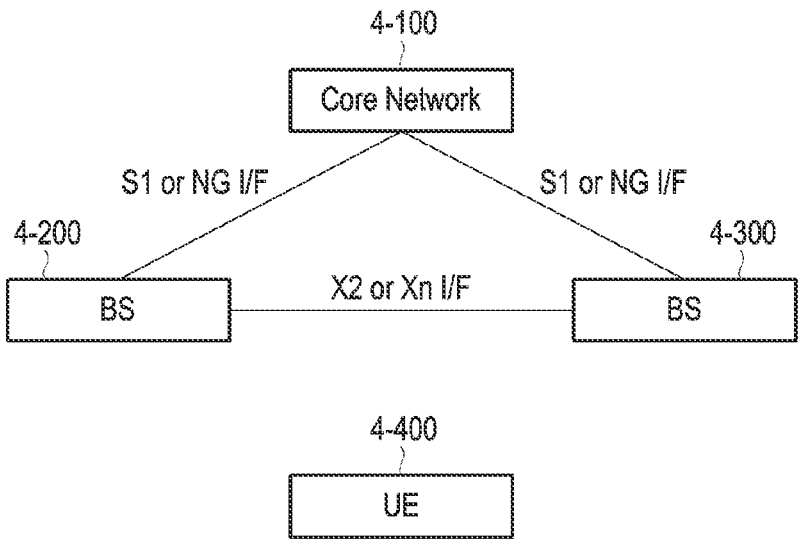
FIG. 4 illustrates an example of a structure of a mobile communication system according to an embodiment of the disclosure.

FIG. 4 illustrates an example of a structure of a mobile communication system according to an embodiment of the disclosure.

Referring to FIG. 4, base stations (BSs) 4-200 and 4-300 may be implemented as a mobile communication base station irrelevant to LTE, eNB, NR gNB, WiFi AP, or radio access technology connected to a mobile communication core network (CN) 4-100 such as an evolved packet core (EPC) or a 5G core network (5GC).

In FIG. 4, the BSs 4-200 and 4-300 may be configured as a single unit or divided into a plurality of units. The BS configured in such a form supports each of the divided mobile communication functions.

Examples of the functions include PDCP/RLC/MAC/PHY/RF layers, one unit may support a plurality of functions, a plurality of functions may be distributed and supported by a plurality of units, or one function may be supported by one or more divided units.

The BSs 4-200 and 4-300 may are connected through an inter-BS interface such as an X2 or Xn interface, and the BSs 4-200 and 4-300 and the CN 4-100 are connected through an interface between the BS and the core network such as an SI or NG interface.

The technology proposed in the disclosure may be applied to the case in which the UE 4-100 is connected to one of the BSs 4-200 and 4-300 and performs handover between the BSs 4-200 and 4-300 regardless of internal configurations of the BSs 4-200 and 4-300.

In the normal handover, a serving BS may determine a target BS according to an internal policy on the basis of measurement information transmitted by the UE 4-100 and transmit radio configuration information received from a target BS to the UE 4-100 so as to connect the UE 4-100 to the target BS. Through the process, the UE 4-100 may be handed over from the serving BS to the target BS.

Figure 5:
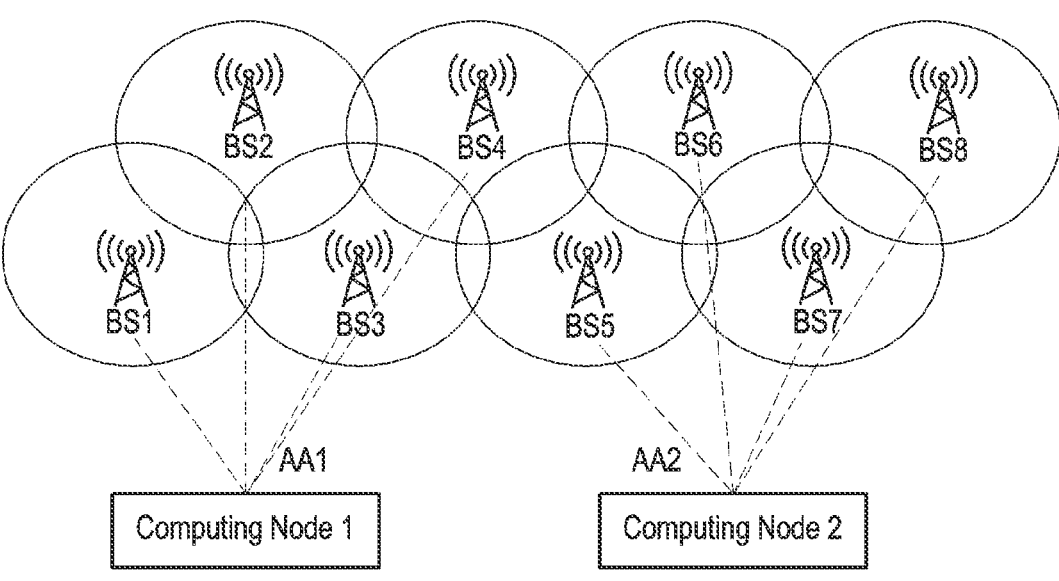
FIG. 5 illustrates an example of a structure of a computing node (CN) for managing a plurality of BSs in a mobile communication system according to an embodiment of the disclosure.

FIG. 5 illustrates an example of a structure of a computing node (CN) for managing a plurality of BSs in a mobile communication system according to an embodiment of the disclosure.

The CN illustrated in FIG. 5 may be implemented as a mobile communication base station irrelevant to LTE, eNB, NR, gNB, WiFi AP, or radio access technology connected to a mobile communication core network (CN) such as an evolved packet core (EPC) or a 5G core network (5GC).

In FIG. 5, the computing node (CN) is a unit that manages one or more BSs. The BS and the CN configured in such a form separately support each of the mobile communication functions. Examples of the functions include RRC/PDCP/RLC/MAC/PHY/RF layers.

The same CN may be the logically same CN or the physically same CN. The logically same CN may be implemented as software of the same owner (or operator), software having the same right, or software performing the same process. The physically same CN may be implemented as hardware of the same owner (or operator), hardware having the same right, or the same hardware component.

One CN manages one or more BSs and is subject to authentication performed by the UE when an AS section between the UE and the BS is authenticated. A set of one or more BSs (or cells) managed by one CN may be referred to as an authentication area (AA). According to an embodiment, the AA may be differently configured for each specific UE, situation, or service.

According to an embodiment, a ratio of the number of cells within the AA to the number of CN may be "1:N" (N being a natural number larger than or equal to 1). According to another embodiment, a ratio of the number of cells within the AA to the number of CN may be "M:N" (M and N being a natural number larger than or equal to 1).

In embodiments of the disclosure, when the UE is handed over within the AA served by the same CN, new PKI authentication with a target BS is not needed.

For example, in FIG. 5, CN1 may divide and support functions with BS1 to BS4 and may manage BS1 to BS4. BSs managed by CN1 are authentication area 1 (AA1).

Further, in FIG. 5, CN2 may divide and support functions with BS5 to BS8 and may manage BS5 to BS8. BSs managed by CN2 are referred to as authentication area 2 (AA2).

Figure 6:
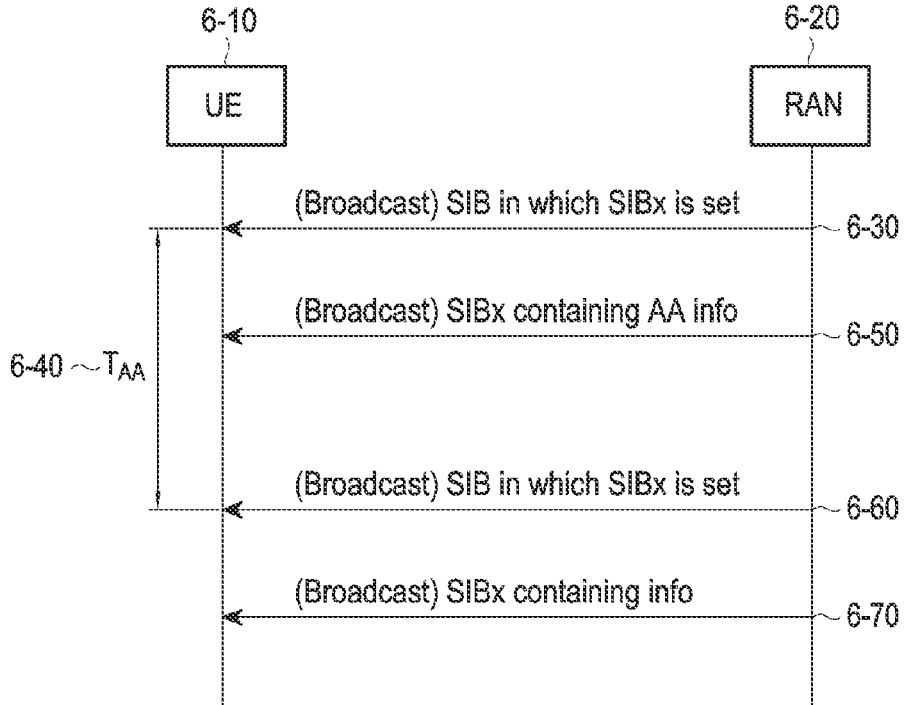
FIG. 6 illustrates a procedure in which the BS broadcasts AA information to the UE through an SIB according to an embodiment of the disclosure.

FIG. 6 illustrates a procedure in which the BS broadcasts AA information to the UE through an SIB according to an embodiment of the disclosure.

The authentication area (AA) is a set of one or more BSs managed by the CN, and the BS may inform the UE of an area to be authenticated in an embodiment of the disclosure.

In FIG. 6, a RAN 6-20 may periodically (or aperiodically) transfer AA information to a UE 6-10 through a system information block (SIB).

The RAN 6-20 may periodically (using a timer $T_{AA}$ 6-40) or aperiodically transmit AA information, and when the UE 6-10 receives the AA information broadcasted by the RAN 6-20, the UE 6-10 should know whether the corresponding RAN belongs to a specific AA. Through the method, the UE 6-10 may receive the AA information not only through the SIB of the serving BS but also through the SIB of a neighbor cell. Further, the method, the UE 6-10 may receive the AA information through the SIB transmitted by the RAN 6-20 as necessary in an RRC inactive or RRC idle state as well as an RRC connected state.

The RAN 6-20 configures a bit indicating transmission of an SIBx for transmitting the AA information in the SIB and broadcasts the SIB in operation 6-30. Thereafter, the RAN 6-20 may insert the AA information into the SIBx and broadcast the same in operation 6-50.

When receiving the AA information, the UE 6-10 may compare the AA information with the current AA of the UE and identify whether the RAN transmitting the AA information belongs to an AA which is the same as that of the serving BS in operation 6-80. The AA information transmitted by the RAN 6-20 may have an identifier for distinguishing the AA information from an AA transmitted by another RAN or an AA transmitted by the corresponding RAN before or after the AA information.

The RAN 6-20 may transmit the AA information according to a predetermined period ($T_{AA}$) determined in advance by the UE 6-10 and the RAN 6-20 without setting the SIBx bit for transmitting the AA in the SIB for transmitting the AA information.

Figure 7A:
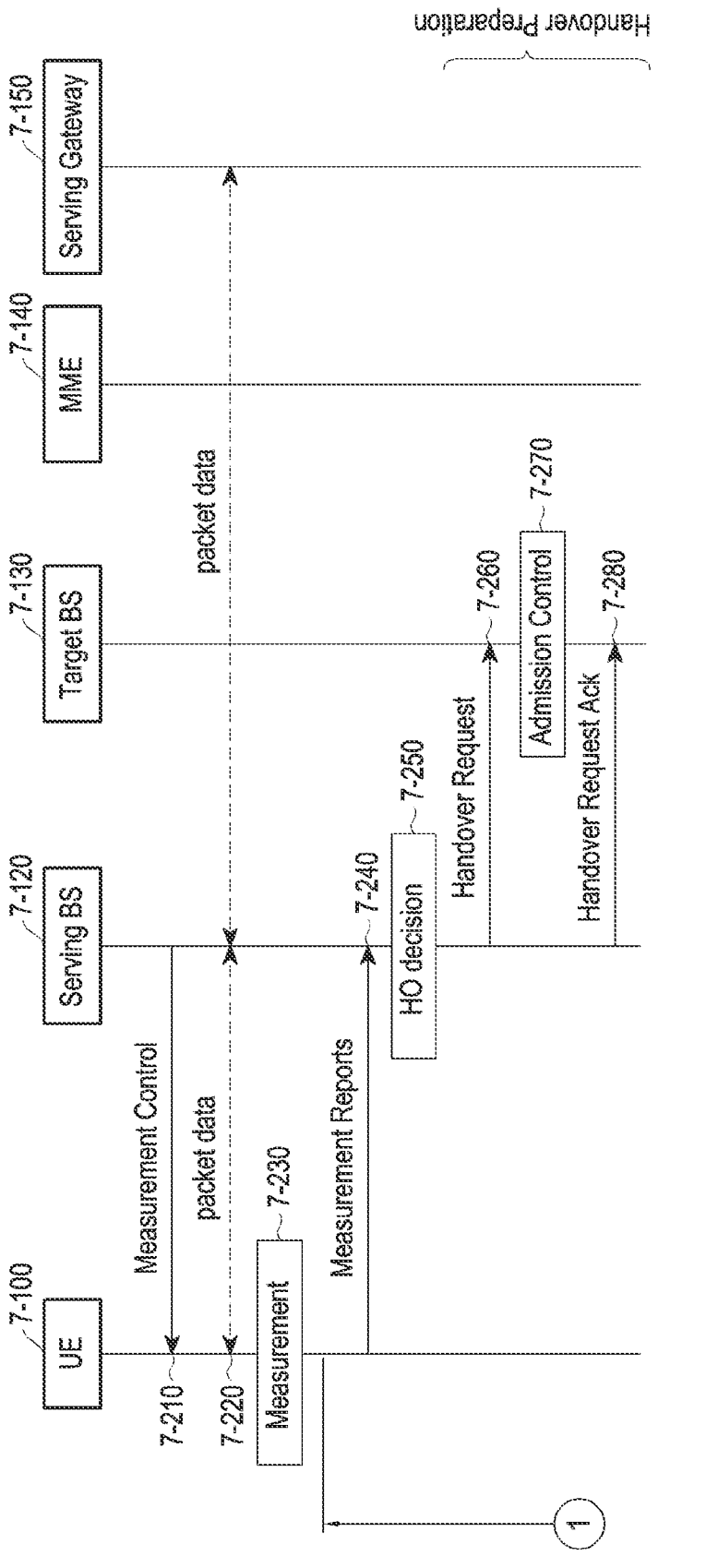
FIGS. 7A and 7B illustrate an example of a procedure of handover according to an embodiment of the disclosure.
Figure 7B:
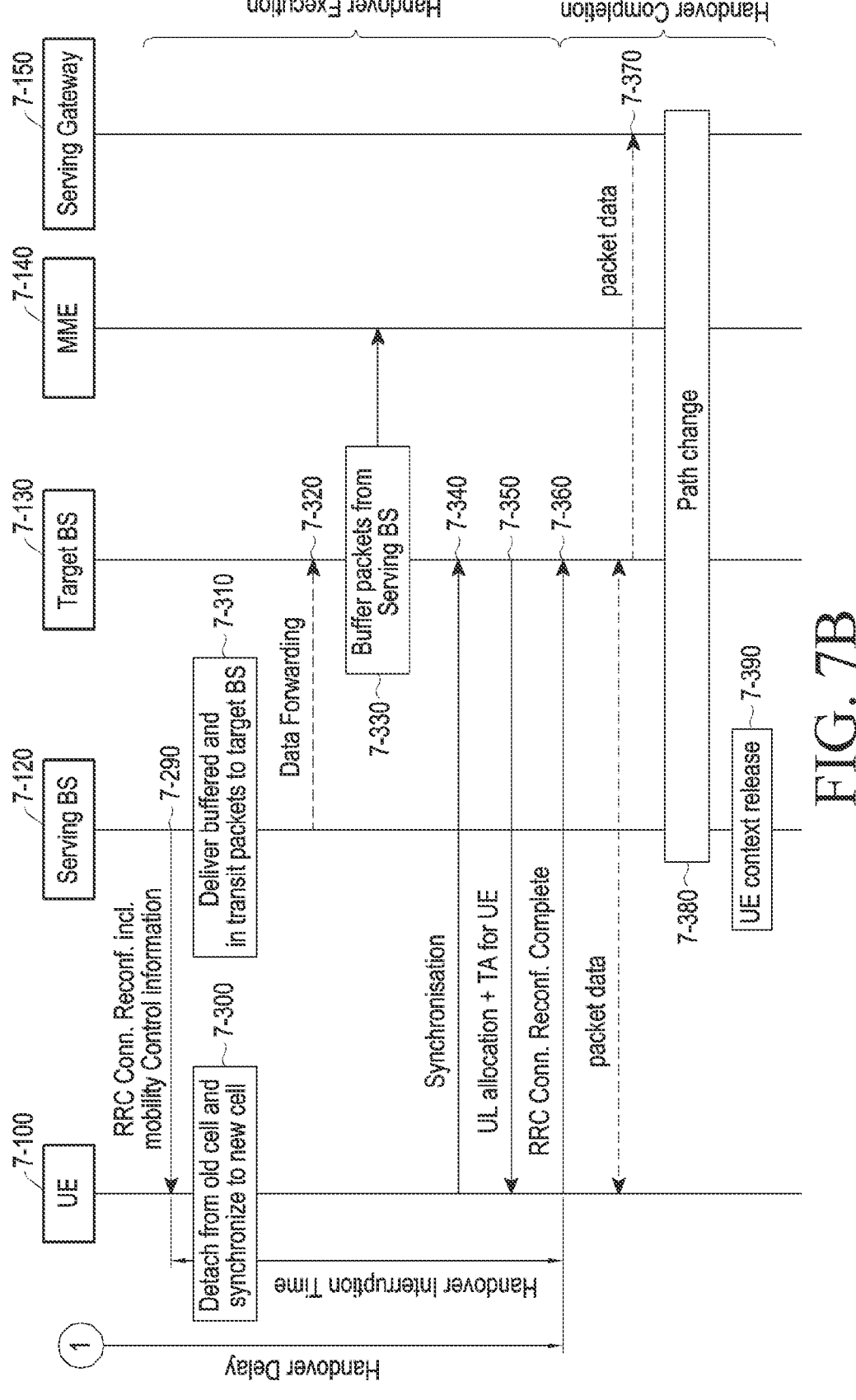

FIGS. 7A and 7B illustrate an example of a procedure of handover according to an embodiment of the disclosure.

According to FIG. 7A, in normal handover, a serving BS 7-120 may determine a target BS 7-130 according to an internal polity on the basis of measurement information transmitted by a UE 7-100, transmit radio configuration information received from the target BS 7-130 to the UE 7-100, and connect the UE 7-100 with the target BS 7-130. Through the process, the UE 7-100 is handed over from the serving BS 7-120 to the target BS 7-130. A detailed process of FIG. 7 is described below.

The serving BS 7-120 may transmit measurement control 7-210 to the UE 7-100. The measurement information provided by the serving BS 7-120 is used for controlling mobility of the UE 7-100. Thereafter, according to normal communication, data communication (packet data) 7-220 is performed.

The UE 7-100 may measure the strength of radio signals of cells of neighbor BSs in measurement operation 7-230 and, when a condition is satisfied with the measurement control 7-210, transmit a measurement report 7-240 to the serving BS 7-120.

When receiving the measurement report 7-240, the serving BS 7-120 may determine handoff of the UE 7-100 on the basis of the measurement report 7-240 in operation 7-250. The serving BS 7-120 may transmit, to the target BS 7-130, a handover request message 7-260 for transferring information required for preparing the handoff to the target BS 7-130.

The target BS 7-130 may perform admission control 7-270 for determining whether to allow the handover. During the process, the target BS 7-130 configures resources required for connecting the UE 7-100 to the target BS 7-130.

When HO preparation is completed, the target BS 7-130 may transmit handover request ack (acknowledgement) 7-280 including information required by the UE 7-100 for the connection to the target BS 7-130 to the serving BS 7-120. The handover request ack message includes radio connection reconfiguration message information received from the target BS 7-130, and the serving BS 7-120 may transmit an RRC connection reconfiguration message 7-290 including the radio connection reconfiguration message information received from the target BS 7-130 to the UE 7-100.

When receiving the RRCConnectionReconfiguration message 7-290 including a parameter required for the handoff, the UE 7-100 detaches from a previous cell and performs synchronization 7-300 to access a new cell. Further, the serving BS 7-120 transmits a received packet to the target BS 7-130 in operations 7-310 and 7-320. The target BS 7-130 receives the packet from the serving BS 7-120.

The UE 7-100 performs synchronization 7-340 for the target BS 7-130 and accesses the target BS 7-130 through a RACH. The target BS 7-130 allocates uplink (UL) resources and responds through TA. The UE 7-100 transmits RRC connection reconfiguration complete 7-360 and indicates completion of the handover.

Thereafter, the UE 7-100 may receive packet data through the target BS 7-130 in operation 7-370. The target BS 7-130 performs a procedure of a path change 7-380 with a network (MME or the like) in order to inform that the UE 7-100 has changed the cell. When receiving a UE context release message from the network, the serving BS 7-130 performs UE context release 7-390.

However, when the normal handover illustrated in FIG. 7 is performed, direct authentication between the UE and the BS is not performed. That is, direct authentication in the access stratum (AS) section does not exist.

In an embodiment of the disclosure, man in the middle (MITM) attack between the UE and the BS due to non-authentication of the AS section can be avoided. Further, in an embodiment of the disclosure, a strong radio signal is transmitted to the UE and thus man in the middle attack of a false base station (FBS) for relaying a radio signal between the UE and the BS can be prevented.

In an embodiment of the disclosure. PHY/MAC/RRC control plain (CP) message forgery of the FBS due to non-authentication of the AS section can be prevented. In an embodiment of the disclosure, attack of falsifying SIB information and transmitting a false disaster message to UEs can be avoided.

In the disclosure, the UE and the BS perform public key infrastructure (PKI)-based authentication, thereby enabling safe communication with a target to be communicated. Through the disclosure, the BS and the UE may protect a message by encrypting/decrypting or digitally signing the message transmitted through a key which the BS/UE know in advance or a key generated through authentication.

FIGS. 8 to 14 illustrate a process of performing a PKI-based AS section authentication procedure according to embodiments of the disclosure in a handover scenario unlike the handover procedure of FIG. 7.

Figure 8A:
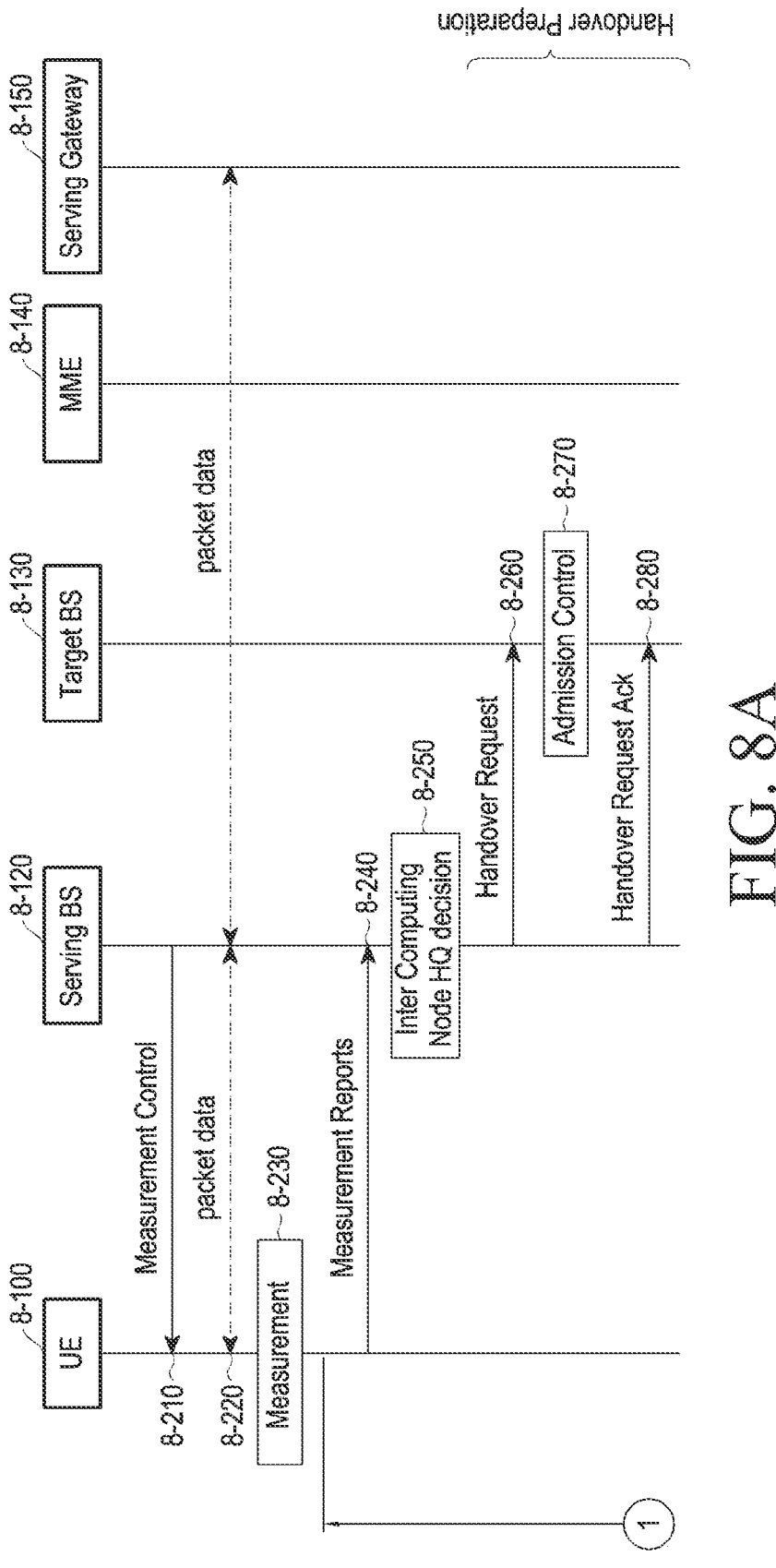
FIGS. 8A and 8B illustrate an authentication procedure in handover of the UE according to an embodiment of the disclosure.
Figure 8B:
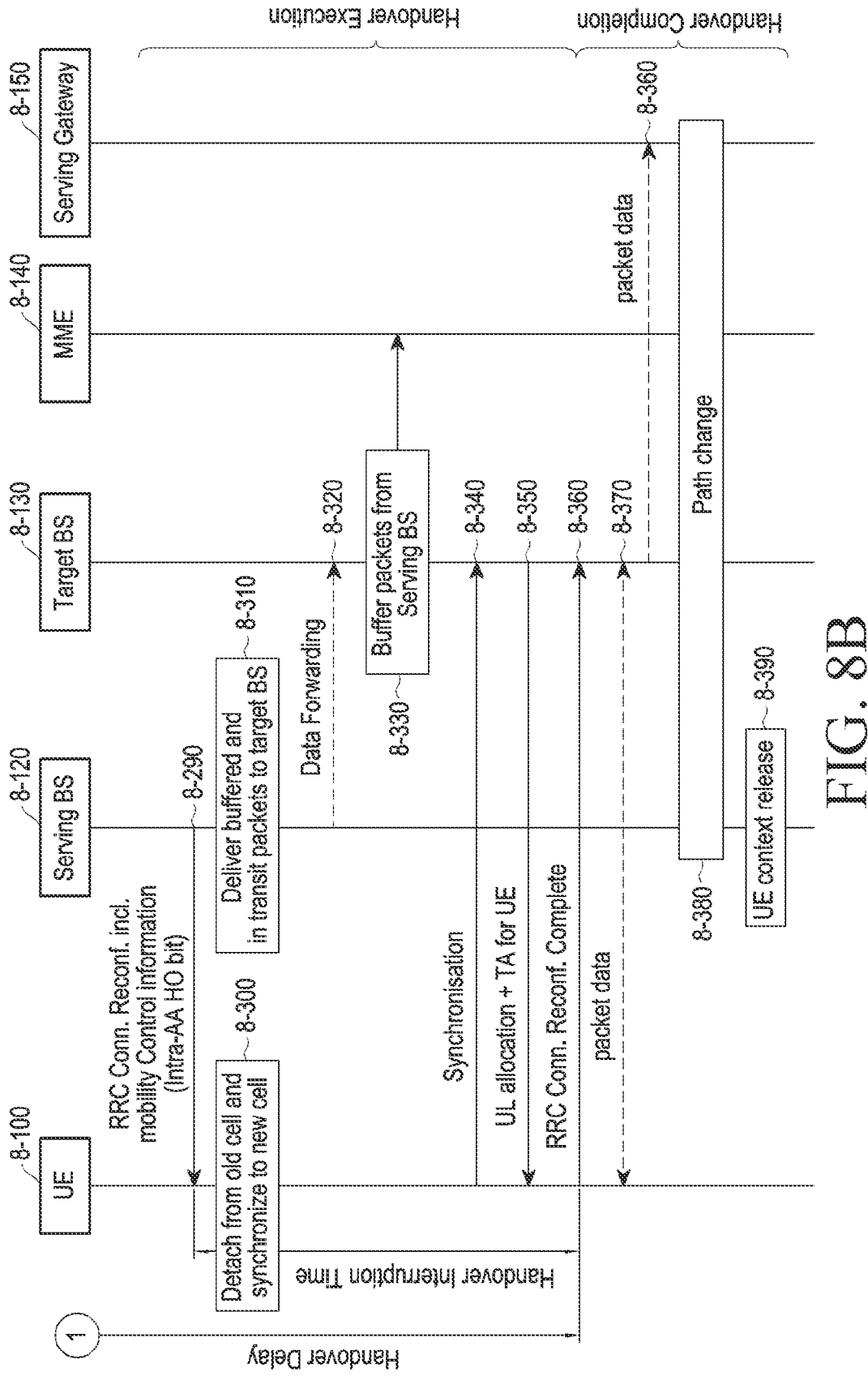

FIGS. 8A and 8B illustrate an authentication procedure in handover of the UE according to an embodiment of the disclosure.

In handover according to FIG. 8A, a serving BS 8-120 may determine a target BS 8-130 according to an internal polity on the basis of measurement information transmitted by a UE 8-100, transmit radio configuration information received from the target BS 8-130 to the UE 8-100, and connect the UE 8-100 to the target BS 8-13.

In the embodiment illustrated in FIGS. 8A and 8B, the serving BS 8-120 may identify that the serving BS belongs to an AA which is the same as that of the target BS 8-130 and allow generation of a key through the existing key derivation without PKI-based authentication. A detailed process is described below.

The serving BS 8-120 may transmit measurement control 8-210 to the UE 8-100. The measurement information provided by the serving BS 8-120 is used for controlling mobility of the UE 8-100. Thereafter, according to normal communication, data communication (packet data) 8-220 is performed.

The UE 8-100 may measure the strength of radio signals of cells of neighbor BSs in measurement operation 8-230 and, when a condition is satisfied with the measurement control 8-210, transmit a measurement report 8-240 to the serving BS 8-120. When receiving the measurement report 8-240, the serving BS 8-120 determines whether to hand off the UE 8-100 and identifies whether the serving BS 8-120 belongs to an AA which is the same as that of the target BS 8-130 in operation 8-250. The serving BS 8-120 may transmit, to the target BS 8-130, a handover request message 8-260 for transferring information required for preparing the handoff to the target BS 8-130. The target BS 8-130 performs admission control 8-270 for determining whether to allow the handover. During the process, the target BS 8-130 configures resources required for connecting the UE 8-100 to the target BS.

When HO preparation is completed, the target BS 8-130 transmits handover request ack (acknowledgement) 8-280 including information required by the UE 8-100 for the connection to the target BS 8-130. The handover request ack message includes radio connection reconfiguration message information received from the target BS 8-130, and the serving BS 8-120 transmits an RRC connection reconfiguration message 8-290 including the radio connection reconfiguration message information received from the target BS 8-130 to the UE 8-100.

The serving BS 8-120 configures an intra-AA HO bit in the RRC connection reconfiguration message 8-290 and informs the UE 8-100 that the serving BS 8-120 and the target BS 8-130 belong to the same AA and PKI authentication is not needed so as to allow generation of a key between the UE 8-100 and the target 7-130 through key derivation.

When receiving the RRCConnectionReconfiguration message 8-290 including a parameter required for the handover and the intra-AA HO bit, the UE 8-100 detaches from a previous cell and performs synchronization 8-300 to access a new cell. Further, the serving BS 8-120 transmit a received packet to the target BS 8-130 in operations 8-310 and 8-320. The target BS 8-130 receives the packet from the serving BS 8-120.

The UE 8-100 performs synchronization 8-340 for the target BS 8-130 and accesses the target BS through a RACH. The target BS 8-130 allocates UL and responds through TA. The UE 8-100 transmits RRC connection reconfiguration complete 8-36) and indicates completion of the handover. Thereafter, the UE 8-100 may receive packet data through the target BS 8-130 in operation 8-370. The target BS 8-130 makes a path change 8-380 in a network (MME or the like) in order to inform that the UE has changed the cell. When receiving a UE context release message from the network, the serving BS 8-120 performs UE context release 8-390.

Thereafter, the UE 8-100 and the target BS 8-130 share an AS section encryption key by Intra-AA handover through key derivation.

Figure 9A:
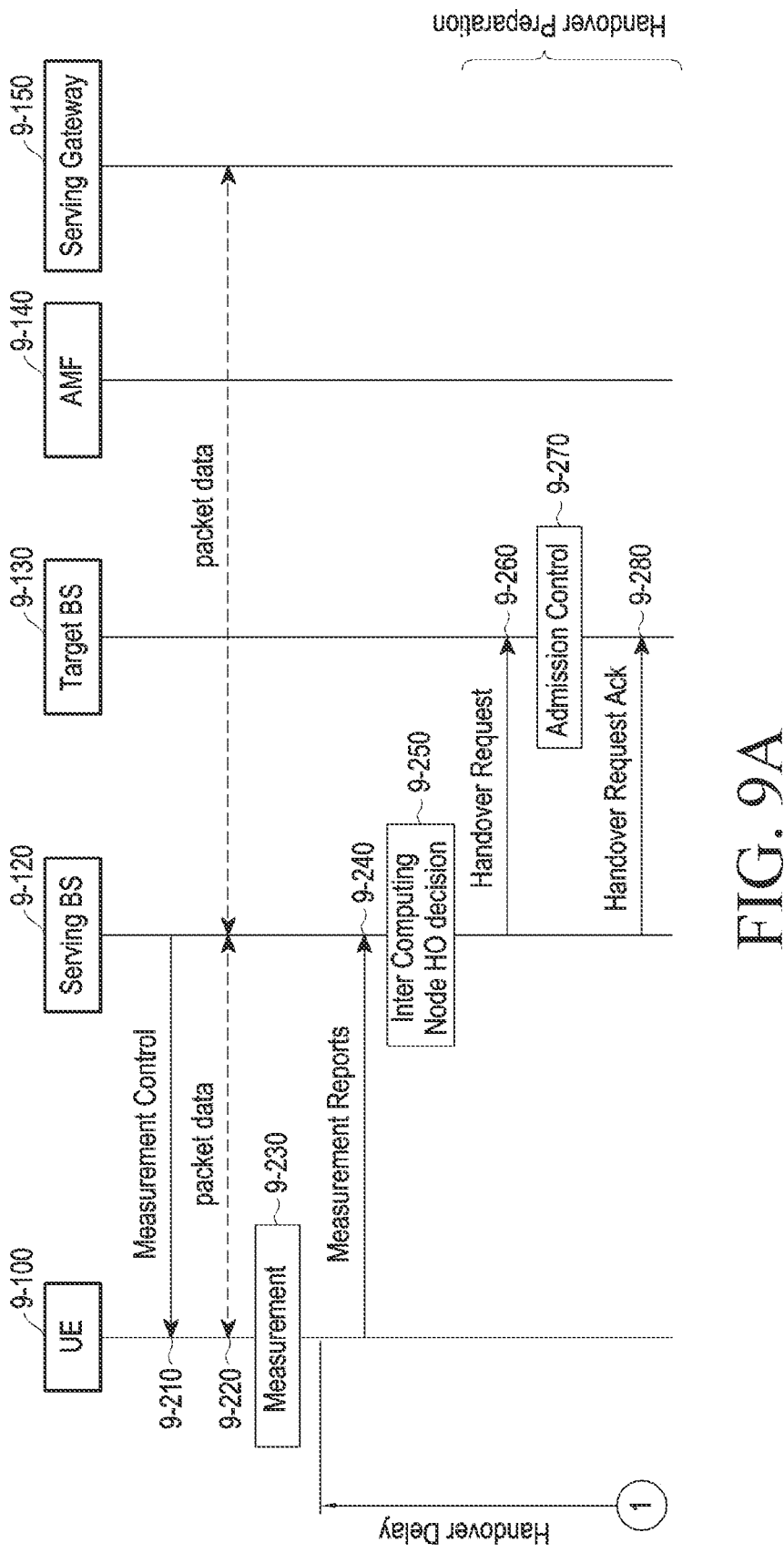
FIGS. 9A and 9B illustrate an authentication procedure in handover of the UE according to another embodiment of the disclosure.
Figure 9B:
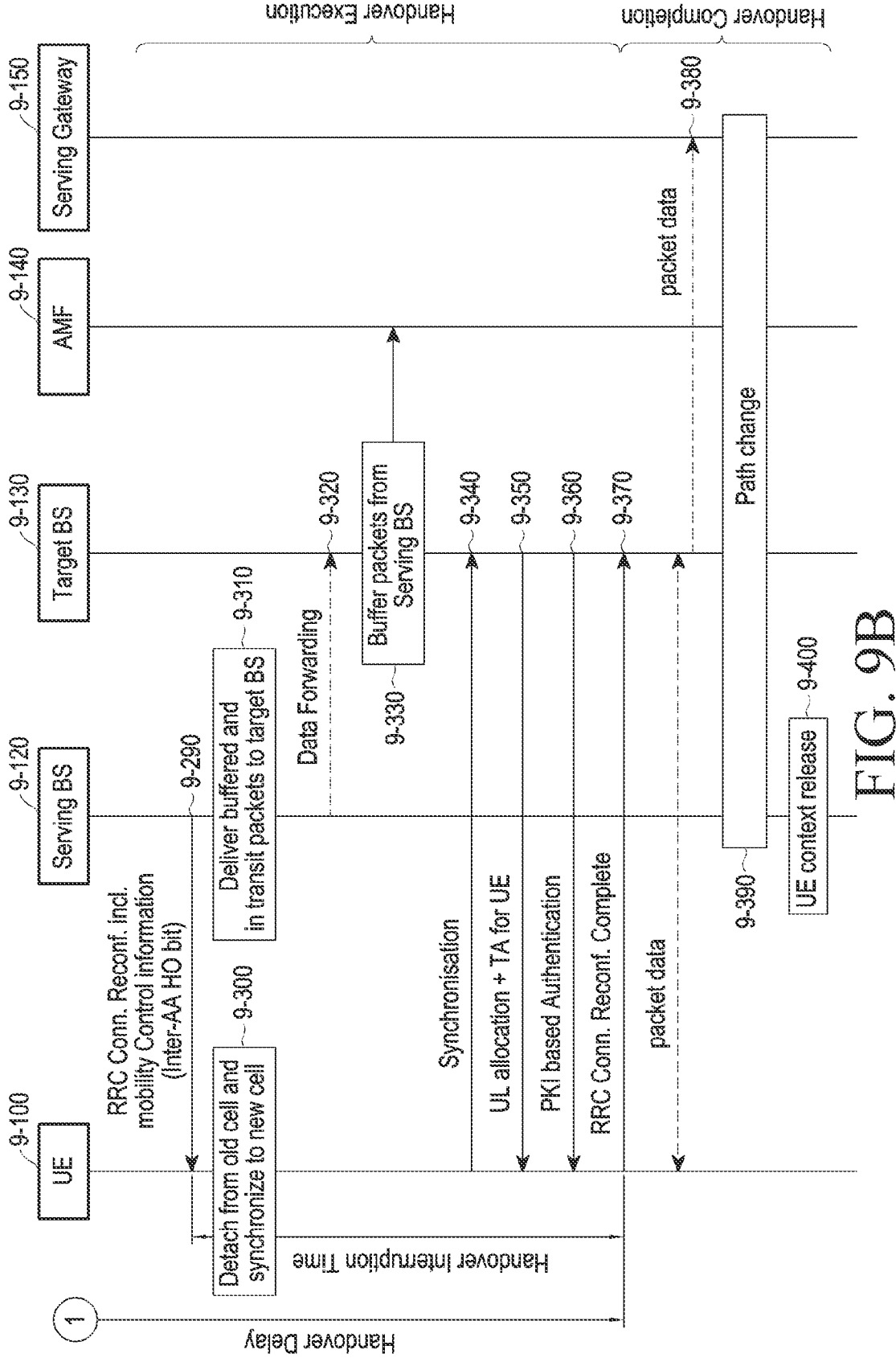

FIGS. 9A and 9B illustrate an authentication procedure in handover of the UE according to another embodiment of the disclosure.

In handover according to FIG. 9A, a serving BS 9-120 may determine a target BS 9-130 according to an internal polity on the basis of measurement information transmitted by a UE 9-100, transmit radio configuration information received from the target BS 9-130 to the UE 9-100, and connect the UE 9-100 to the target BS 9-130. The serving BS 9-120 identifies that the serving BS belongs to an AA different from that of the target BS 9-130 and allows generation of a key between the UE 9-100 and the target BS 9-130 through PKI-based authentication. In FIG. 8, a computing node (CN) refers to a base station, a BS, and a target to be authenticated, and a detailed process is described below.

The serving BS 9-120 transmits measurement control 9-210 to the UE 9-100. The measurement information provided by the serving BS 9-120 is used for controlling mobility of the UE 9-100. Thereafter, according to normal communication, data communication (packet data) 9-220 is performed. The UE 9-100 measures the strength of radio signals of cells of neighbor BSs in measurement operation 9-230 and, when a condition is satisfied with the measurement control 9-210, transmits a measurement report 9-240 to the serving BS 9-120. When receiving the measurement report 9-240, the serving BS 9-120 determines handoff of the UE 9-100 and identifies whether the serving BS 9-120 belongs to an AA which is the same as that of the target BS 9-130 in operation 9-250.

The serving BS 9-120 may transmit, to the target BS 9-130, a handover request message 9-260 for transferring information required for preparing the handoff to the target BS 9-130. The target BS 9-130 performs admission control

9-270 for determining whether to allow the handover. During the process, the target BS 9-130 configures resources required for connecting the UE 9-100 to the target BS 9-130. When HO preparation is completed, the target BS 9-130 transmits handover request ack (acknowledgement) 9-280 including information required by the UE 9-100 for the connection to the target BS 9-130. The handover request ack message includes radio connection reconfiguration message information received from the target BS 9-130, and the serving BS 9-120 transmits an RRC connection reconfiguration message 9-290 including the radio connection reconfiguration message information received from the target BS 9-130 to the UE 9-100.

The serving BS 9-120 configures an inter-AA HO bit in the RRC connection reconfiguration message 9-290 and informs the UE 9-100 that PKI authentication is needed since the serving BS 9-120 and the target BS 9-130 belong to different AAs in operation 9-290. According to an embodiment, the RRC connection reconfiguration message 9-290 may include information indicating inter-AA HO which is not the type of inter-AA HO bit, and the information indicating the inter-AA HO may indicate that the serving BS 9-120 and the target BS 9-130 belong to different AAs.

When receiving the RRC connection reconfiguration message 9-290 including a parameter required for the handover and the inter-AA HO bit (or inter-AA HO information), the UE 9-100 detaches from a previous cell and performs synchronization 9-300 to access a new cell. Further, the serving BS 9-120 transmits a received packet to the target BS 9-130 in operations 9-310 and 9-320. The target BS 9-130 receives the packet from the serving BS 9-120. The target BS 9-130 may transmit a buffer packet from the serving BS 9-120 to the AMF 9-140 in operation 9-330. The UE 9-100 performs synchronization 9-340 for the target BS and accesses the target BS 9-130 through a RACH. The target BS 9-130 allocates UL and responds through TA in operation 9-350. The UE 9-100 and the target BS 9-130 perform PKI-based authentication, and a detailed operation of the PKI-based authentication 9-30 is illustrated in FIGS. 17 to 21.

The UE 9-100 transmits RRC connection reconfiguration complete 9-370 and indicates completion of the handover. Thereafter, the UE 9-100 may receive packet data through the target BS 9-130 in operation 9-380. The target BS 9-130 makes a path change 9-390 in a network (MME or the like) in order to inform that the UE 9-100 has been handed over. When receiving a UE context release message from the network, the serving BS 9-120 performs UE context release 9-400.

Thereafter, the UE 9-100 and the target BS 9-130 share an AS section encryption key by using the generated key after the PKI-based authentication.

Figure 10A:
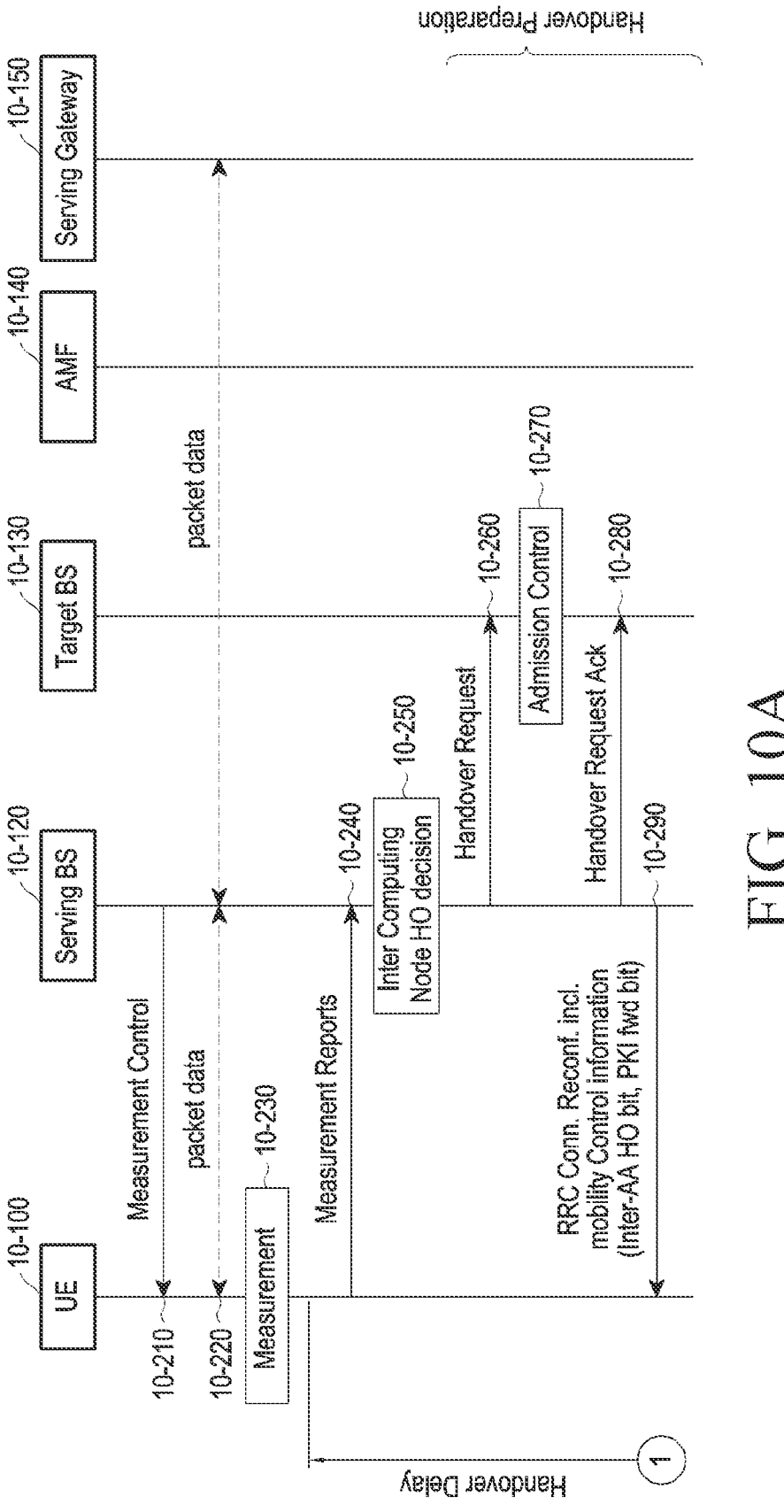
FIGS. 10A and 10B illustrate an authentication procedure in handover of the UE according to another embodiment of the disclosure.
Figure 10B:
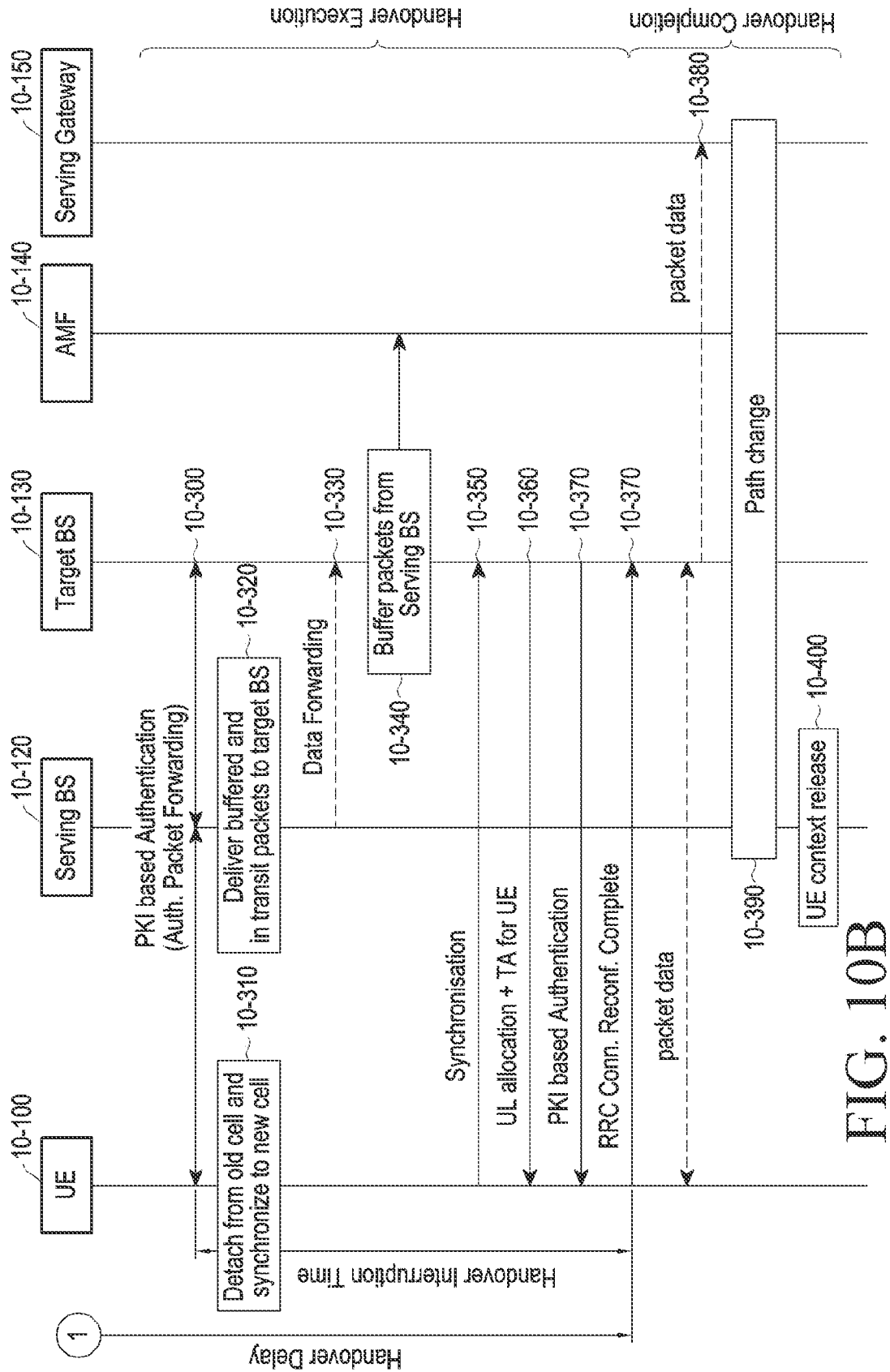

FIGS. 10A and 10B illustrate the authentication procedure in handover of the UE according to another embodiment of the disclosure.

In handover according to FIG. 10A, a serving BS 10-120 may determine a target BS 10-130 according to an internal polity on the basis of measurement information transmitted by a UE 10-100, transmit radio configuration information received from the target BS 10-130 to the UE 10-100, and connect the UE 10-100 to the target BS 10-130. The serving BS 10-120 identifies that the serving BS belongs to an AA different from that of the target BS 10-130 and allows generation of a key between the UE 10-100 and the target BS 10-130 through PKI-based authentication. The serving BS 10-120 may forward message transmission for authentication of the target BS 10-130 by the UE 10-100 and reduce a handover interruption time that is a handover delay time during the handover process. A computing node (CN) refers to a base station, a BS, and a target to be authenticated, and a detailed process is described below.

The serving BS 10-120 transmits measurement control 10-210. The measurement information provided by the serving BS 10-120 is used for controlling mobility of the UE 10-100. Thereafter, according to normal communication, data communication (packet data) 10-220 is performed. The UE measures the strength of radio signals of cells of neighbor BSs in measurement operation 10-230 and, when a condition is satisfied with the measurement control 10-210, transmits a measurement report 10-240 to the serving BS 10-120. When receiving the measurement report 10-240, the serving BS 10-120 decides handoff of the UE 10-100 through a proper determination and identifies whether the serving BS 10-120 belongs to an AA which is the same as that of the target BS 10-130 in operation 10-250. The serving BS 10-120 may transmit, to the target BS 10-130, a handover request message 10-260 for transferring information required for preparing the handoff to the target BS 10-130. The target BS 10-130 performs admission control 10-270 for determining whether to allow the handover. During the process, the target BS 10-130 configures resources required for connecting the UE 10-100 to the target BS 10-130. When HO preparation is completed, the target BS 10-130 transmits handover request ack (acknowledgement) 10-280 including information required by the UE 10-100 for the connection to the target BS. The handover request ack message includes radio connection reconfiguration message information received from the target BS 10-130, and the serving BS 10-120 transmits an RRC connection reconfiguration message 10-290 including the radio connection reconfiguration message information received from the target BS 10-130 to the UE 10-100. The serving BS 10-120 configures an inter-AA HO bit (or inter-AA HO information) in the RRC connection reconfiguration message 10-290 to inform that the serving BS 10-200 and the target BS 10-130 belong to different AAs and thus PKI authentication is needed and configures a PKI fwd bit to inform that authentication with the target BS 10-130 can be performed through the serving BS 10-120 in operation 10-290.

When the UE 10-100 receives the RRC connection reconfiguration message 10-290 including the parameter required for the handover and the inter-AA HO bit (or inter-AA HO information)/PKI fwd bit, the UE 10-100 and the target BS 10-130 perform PIK-based authentication, and a detailed operation 10-300 is illustrated in FIGS. 17 to 21. During a process of performing authentication between the UE 10-100 and the target BS 10-13, the serving BS 10-120 and the target BS 10-130 can perform direct communication and the serving BS 10-120 may transfer an authentication message to the target BS 10-130 in operation 10-300.

The UE 10-100 detaches from the previous cell and performs synchronization 10-310 to access a new cell. Further, the serving BS 10-120 transmits a received packet to the target BS 10-130 in operations 10-320 and 10-330. The target BS 10-130 receives the packet from the serving BS 10-120. The target BS 10-130 may transmit a buffer packet received from the serving BS 10-120 to the AMF 10-140 in operation 10-340.

The UE 10-100 performs synchronization 10-350 for the target BS 10-130 and accesses the target BS through a RACH. The target BS 10-130 allocates UL and responds through TA in operation 10-360. The UE 10-100 transmits RRC connection reconfiguration complete 10-370 and indicates completion of the handover. Thereafter, the UE 10-100 may receive packet data through the target BS in operation 10-380. The target BS 10-130 makes a path change 10-390 in a network (MME or the like) in order to inform that the UE 10-100 has changed the cell. When receiving a UE context release message from the network, the serving BS 10-120 performs UE context release 10-390.

The UE 10-100 and the target BS 10-130 share an AS section encryption key by using the generated key after the PKI-based authentication.

Figure 11A:
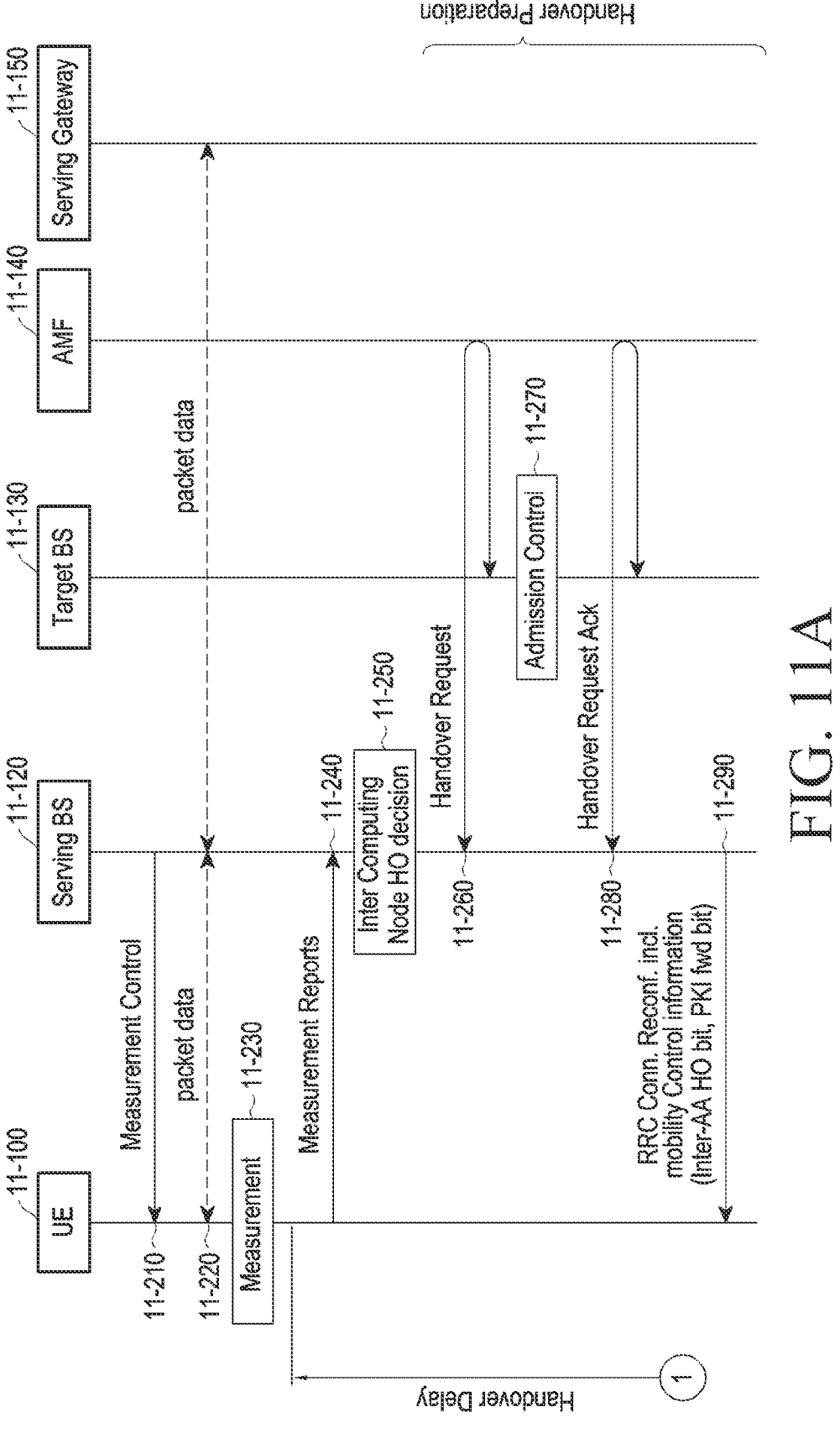
FIGS. 11A and 11B illustrate the authentication procedure in handover of the UE according to another embodiment of the disclosure.
Figure 11B:
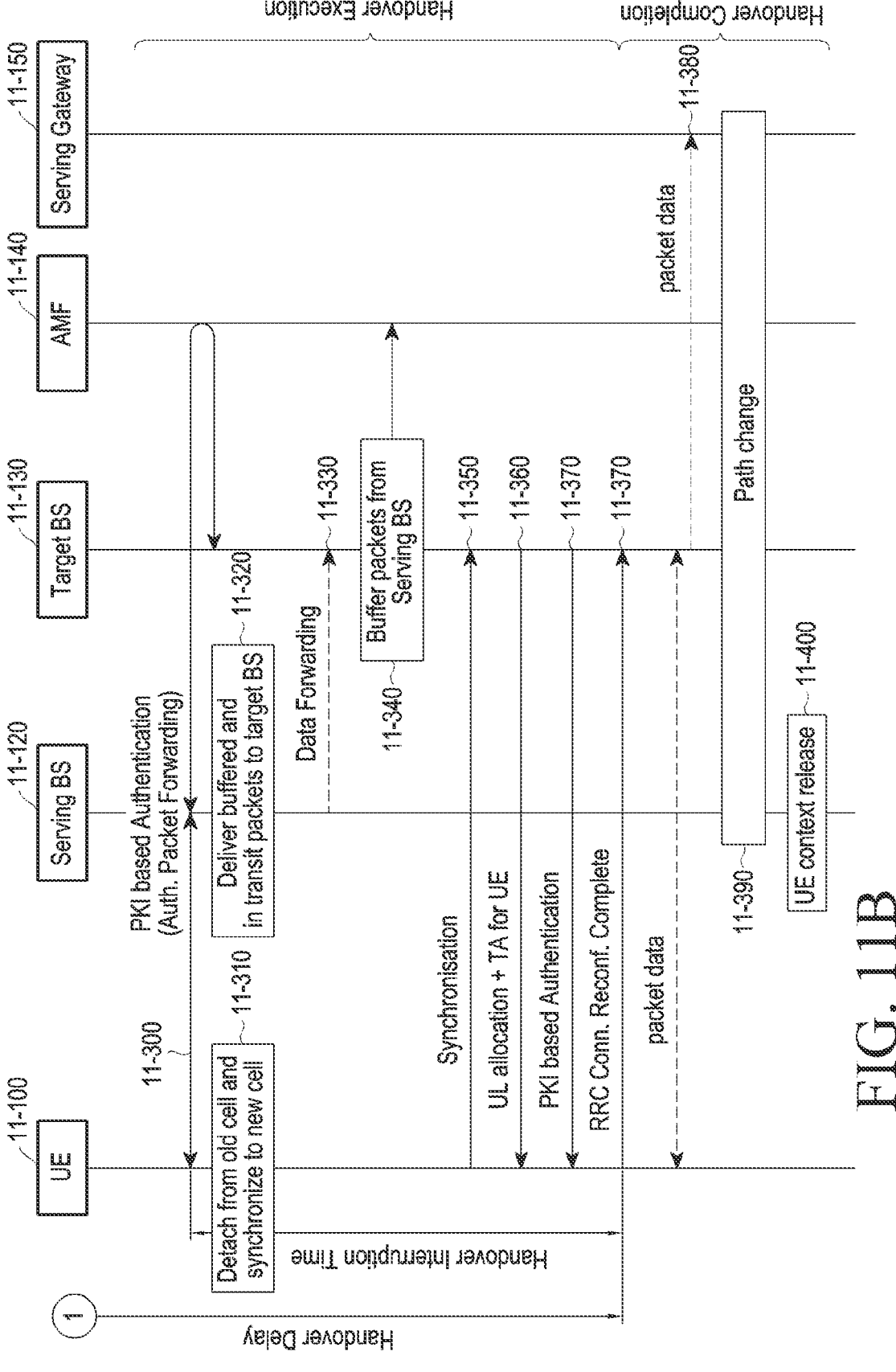

FIGS. 11A and 11B illustrate the authentication procedure in handover of the UE according to another embodiment of the disclosure.

In handover according to FIG. 11A, a serving BS 11-120 may determine a target BS 11-130 according to an internal polity on the basis of measurement information transmitted by a UE 11-100, transmit radio configuration information received from the target BS 11-130 to the UE 11-100, and connect the UE 11-100 to the target BS 11-130. The serving BS 11-120 identifies that the serving BS belongs to an AA different from that of the target BS 11-130 and allows generation of a key between the UE 11-100 and the target BS 11-130 through PKI-based authentication.

During a process in which the UE 11-100 transmits a message for authentication with the target BS, the serving BS 11-120 may forward the message through the AMF 11-140. A computing node (CN) refers to a base station, a BS, and a target to be authenticated, and a detailed process is described below.

The serving BS 11-120 transmits measurement control 11-210. The measurement information provided by the serving BS 11-120 is used for controlling mobility of the UE 11-100. Thereafter, according to normal communication, data communication (packet data) 11-220 is performed. The UE 11-100 measures the strength of radio signals of cells of neighbor BSs in measurement operation 11-230 and, when a condition is satisfied with the measurement control 11-210, transmits a measurement report 11-240 to the serving BS 11-120. When receiving the measurement report 11-240, the serving BS 11-120 determines handoff of the UE 11-100 and identifies whether the serving BS 11-120 belongs to an AA which is the same as that of the target BS 11-130 in operation 11-250.

The serving BS 11-120 transmits, to the target BS 11-130, a handover request message 11-260 for transferring information required for preparing the handoff to the target BS 11-130 through the AMF 11-240. The target BS 11-130 performs admission control 11-270 for determining whether to allow the handover. During the process, the target BS 11-130 configures resources required for connecting the UE 11-100 to the target BS 11-130. When HO preparation is completed, the target BS 11-130 transmits handover request ack (acknowledgement) 11-280 including information required by the UE 11-100 for the connection to the target BS 11-130. The handover request ack message includes radio connection reconfiguration message information received from the target BS 11-130, and the serving BS 11-120 transmits an RRC connection reconfiguration message 11-290 including the radio connection reconfiguration message information received from the target BS 11-130 to the UE 11-100. The serving BS configures an inter-AA HO bit (or inter-AA HO information) in the RRC connection reconfiguration message 11-290 to inform that the serving BS 11-120 and the target BS 11-130 belong to different AAs and thus PKI authentication is needed and configures a PKI fwd bit to inform that authentication with the target BS 11-130 can be performed through the serving BS 11-120 in operation 11-290.

When the UE 11-100 receives the RRC connection reconfiguration message 11-290 including the parameter required for the handover and the inter-AA HO bit (or inter-AA HO information)/PKI fwd bit, the UE 11-100 and the target BS 11-130 perform PIK-based authentication, and a detailed operation 11-300 is illustrated in FIGS. 17 to 21.

During a process of performing authentication between the UE 11-100 and the target BS 11-130, the serving BS 11-120 and the target BS 11-130 can perform direct communication and the serving BS 11-120 may transfer an authentication message to the target BS 11-130 in operation 11-300. The UE 11-100 detaches from the previous cell and performs synchronization 11-310 for access to a new cell. Further, the serving BS 11-120 transmits a received packet to the target BS in operations 11-320 and 11-330. The target BS 11-130 receives the packet from the serving BS 11-120. The UE 11-100 performs synchronization 11-350 for the target BS 11-130 and accesses the target BS through a RACH. The target BS 11-130 allocates UL and responds through TA in operation 11-360. The UE 11-100 transmits RRC connection reconfiguration complete 11-370 and indicates completion of the handover. Thereafter, the UE 11-100 may receive packet data through the target BS 11-130 in operation 11-380. The target BS 11-130 makes a path change 11-390 in a network (MME or the like) in order to inform that the UE 11-100 has been handed over. When receiving a UE context release message from the network, the serving BS 11-120 performs UE context release 11-400.

The UE 11-100 and the target BS 11-130 share an AS section encryption key by using the generated key after the PKI-based authentication.

Figure 12A:
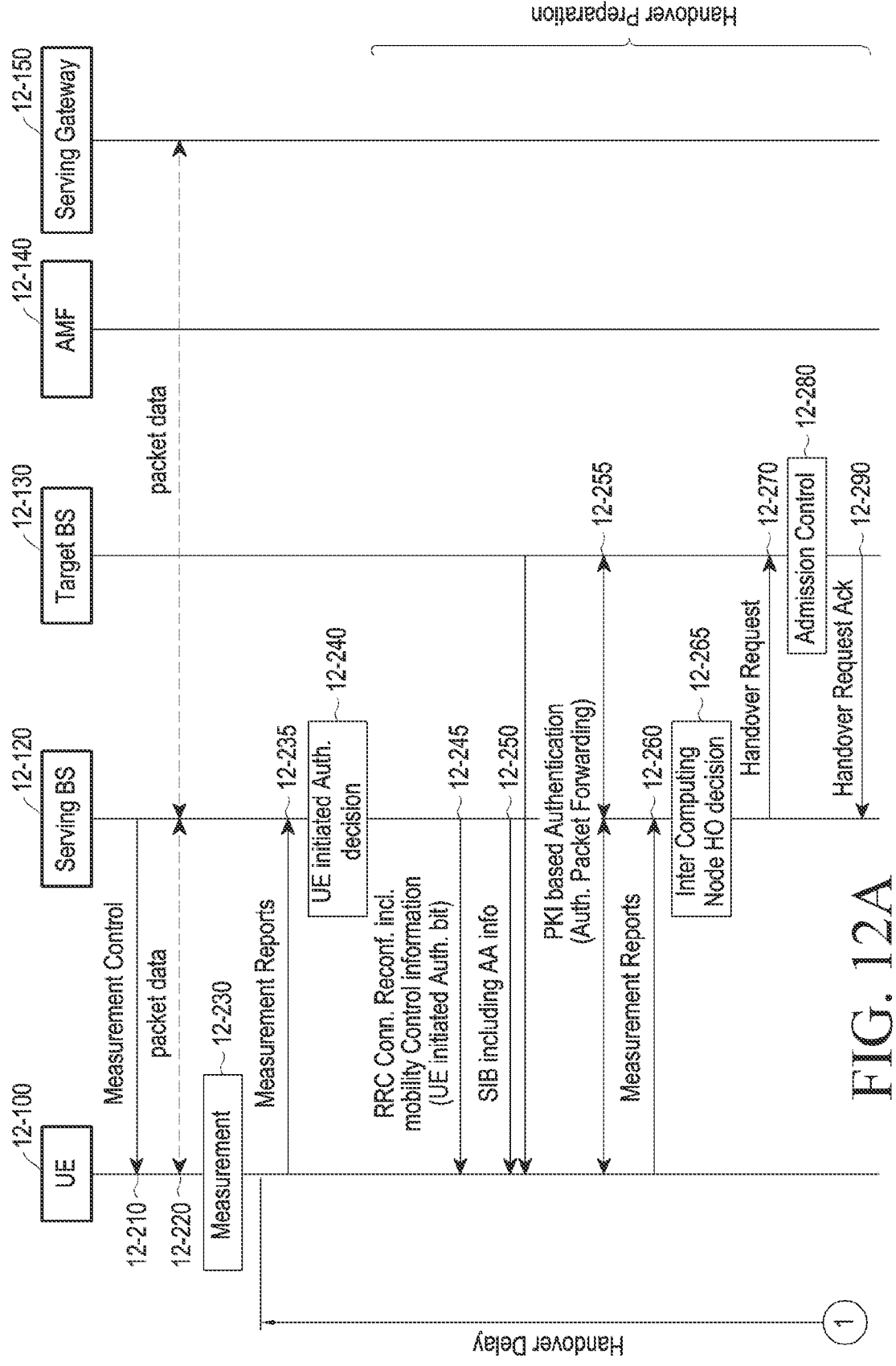
FIGS. 12A and 12B illustrate the authentication procedure in handover of the UE according to another embodiment of the disclosure.
Figure 12B:
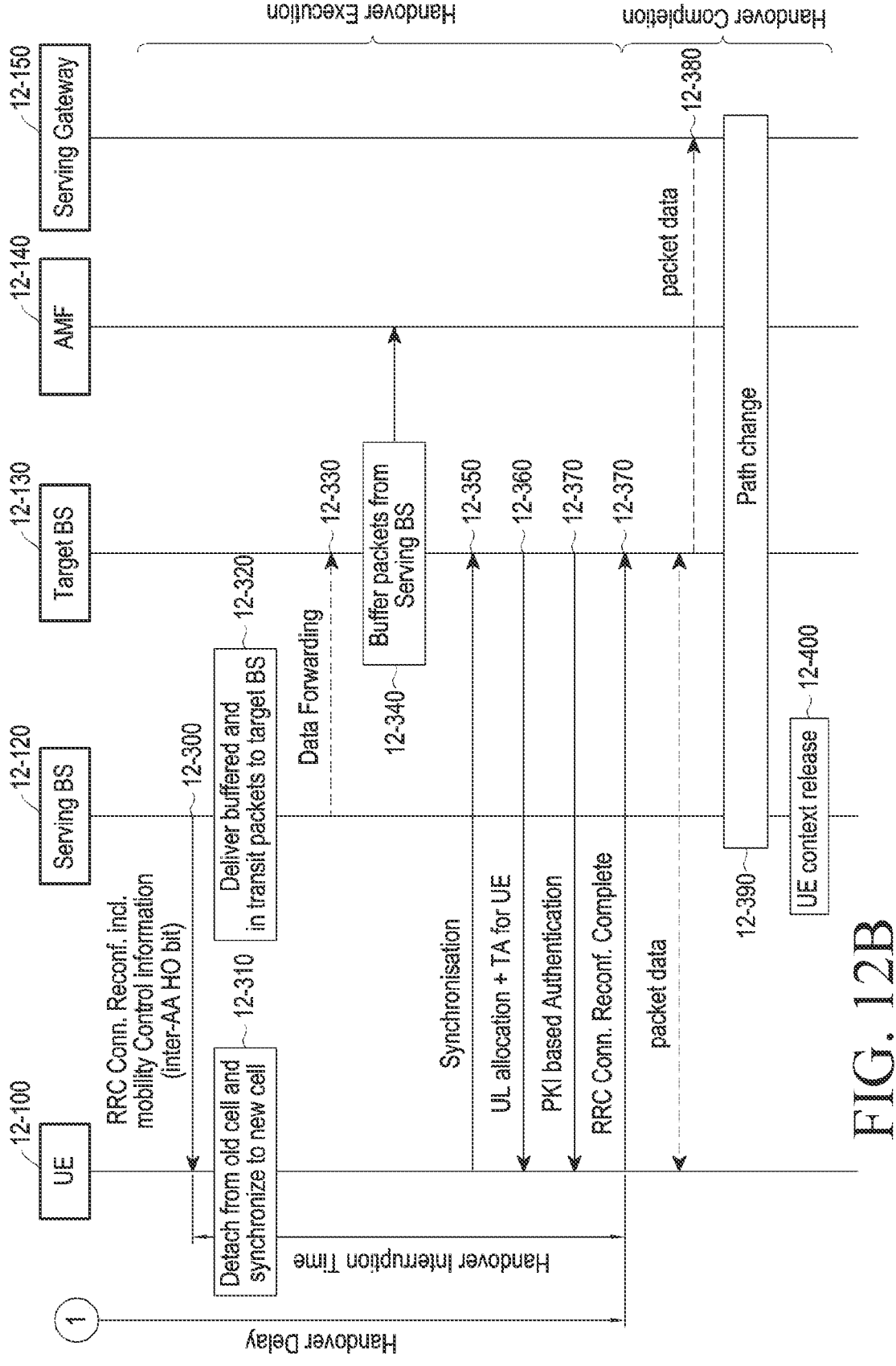

FIGS. 12A and 12B illustrate the authentication procedure in handover of the UE according to another embodiment of the disclosure.

Referring to FIG. 12A, a serving BS 12-120 may configure a UE 12-100 to allow authentication with another BS. When receiving a message for allowing authentication with another BS from the serving BS 12-120, the UE 12-100 identifies a BS required to be authenticated on the basis of authentication area (AA) information transmitted by BSs.

The UE 12-100 performs authentication with a BS having an AA different from that of the serving BS 12-120. The serving BS 12-120 may forward message transmission for authentication of the target BS 12-130 by the UE 12-100. A computing node (CN) refers to a base station, a BS, and a target to be authenticated, and a detailed process is described below.

The serving BS 12-120 transmits measurement control 12-210. The measurement information provided by the serving BS 12-120 is used for controlling mobility of the UE 12-100. Thereafter, according to normal communication, data communication (packet data) 12-220 is performed. The UE 12-100 measures the strength of radio signals of cells of neighbor BSs in measurement operation 12-230 and, when a condition is satisfied with the measurement control 12-210, transmits a measurement report 12-235 to the serving BS 12-120.

The serving BS 12-120 determines whether to allow the UE 12-100 to perform authentication with another BS in operation 12-240. The serving BS 12-120 sets a bit for allowing the UE 12-100 to perform authentication with another BS in an RRC connection reconfiguration message and transmits the RRC connection reconfiguration message to the UE 12-100 in operation 12-245. The UE 12-100 receives AA information transmitted by BSs and identifies whether the BSs belong to AAs different from the AA of the serving BS 12-120 in operation 12-250.

The UE 12-100 and the target BS 12-120 perform PKI-based authentication, and a detailed operation 12-255 is illustrated in FIGS. 17 to 21. During a process of performing authentication between the UE 12-100 and the target BS 12-130, the serving BS 12-120 and the target BS 12-130 can perform direct communication and the serving BS 12-120 may transfer an authentication message to the target BS 12-130 in operation 12-255.

The UE 12-100 measures the strength of radio signals of cells of neighbor BSs in measurement operation 12-260 and, when a condition is satisfied with the measurement control 12-210, transmits a measurement report 12-260 to the serving BS 12-120. When receiving the measurement report 12-260, the serving BS 12-120 determines handoff of the UE 12-10 and identifies whether the serving BS 12-120 belongs to an AA which is the same as that of the target BS 12-130 in operation 10-265.

The serving BS 12-120 may transmit, to the target BS 12-130, a message of a handover request 12-270 for transferring information required for preparing the handoff to the target BS 12-130. The target BS 12-130 performs admission control 12-280 for determining whether to allow the handover. During the process, the target BS 12-130 configures resources required for connecting the UE 12-100 to the target BS 12-130. When HO preparation is completed, the target BS 12-130 transmits handover request ack (acknowledgement) 12-290 including information required by the UE 12-100 for the connection to the target BS 8-130. The handover request ack message includes radio connection reconfiguration message information received from the target BS 12-130, and the serving BS 12-120 transmits an RRC connection reconfiguration message 12-300 including the radio connection reconfiguration message information received from the target BS 12-130 to the UE 12-100.

The serving BS 12-120 configures an inter-AA HO bit (or inter-AA HO information) in the RRC connection reconfiguration message 12-300 to inform that the serving BS 12-120 and the target BS 12-130 belong to different AAs and thus PKI authentication is needed and configures a PKI fwd bit to inform that authentication with the target BS 12-130 can be performed through the serving BS 12-120 in operation 12-230. When the UE 12-100 receives the RRC connection reconfiguration message 12-200 including the parameter required for the handover and the inter-AA HO bit (or inter-AA HO information)/PKI fwd bit, the UE 12-100 and the target BS 12-130 may perform PK-based authentication, but do not need to perform authentication if authentication has been performed in advance in operation 12-300.

The UE 12-100 detaches from the previous cell and performs synchronization 12-310 for access to a new cell. Further, the serving BS 12-120 transmits a received packet to the target BS 12-130 in operations 12-320 and 12-330. The target BS 12-130 receives the packet from the serving BS 12-120.

The UE 12-100 performs synchronization 12-350 for the target BS 12-130 and accesses the target BS through a RACH. The target BS 12-130 allocates UL and responds through TA in operation 12-360. The UE 12-100 transmits RRC connection reconfiguration complete 12-370 and indicates completion of the handover. Thereafter, the UE 12-100 may receive packet data through the target BS 12-130 in operation 12-380. The target BS 12-130 makes a path change 12-390 in a network (MME or the like) in order to inform that the UE has been handed over. When receiving a UE context release message from the network, the serving BS 12-120 performs UE context release 12-400.

The UE 12-100 and the target BS 12-130 share an AS section encryption key by using the generated key after the PKI-based authentication.

Figure 13A:
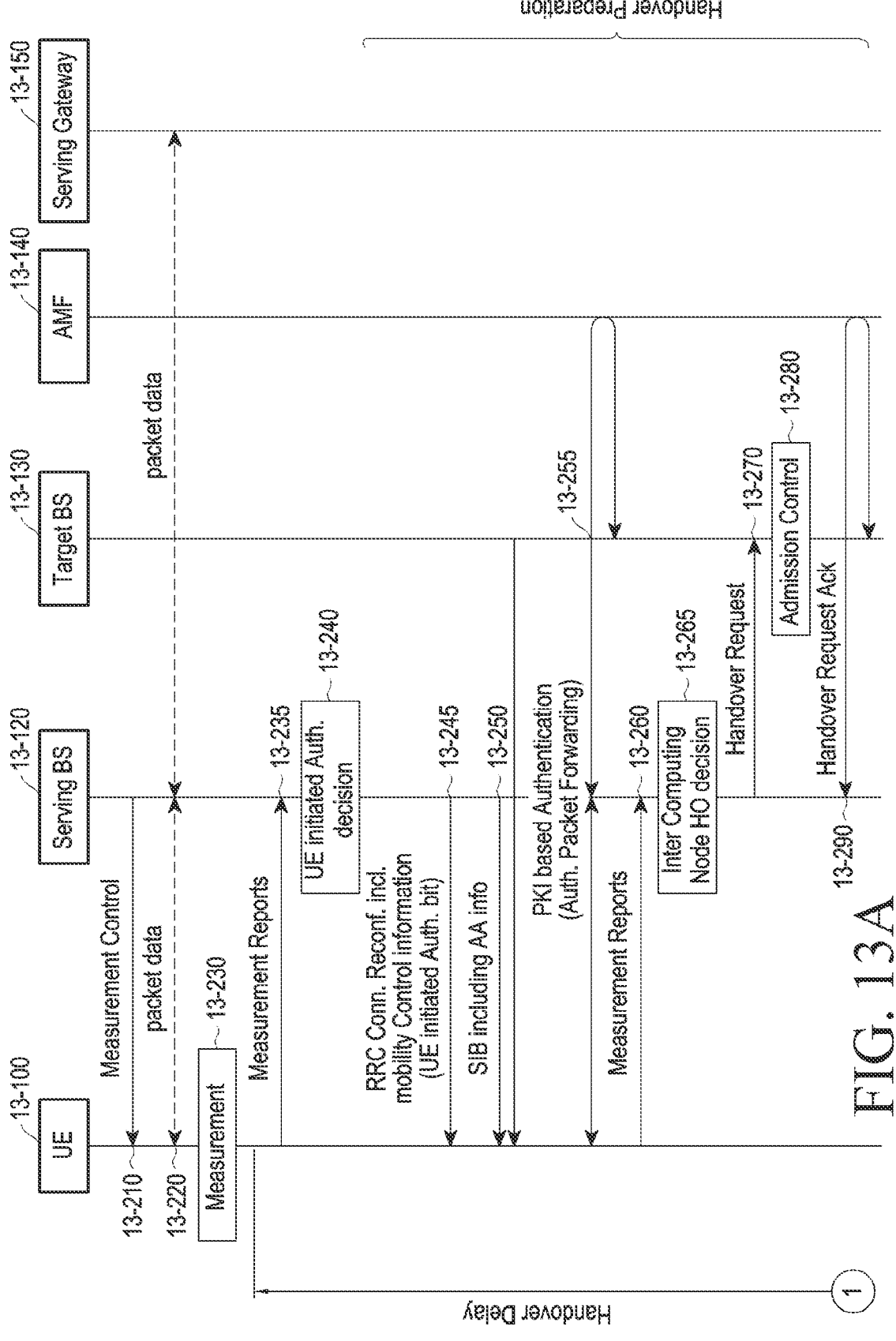
FIGS. 13A and 13B illustrate the authentication procedure in handover of the UE according to another embodiment of the disclosure.
Figure 13B:
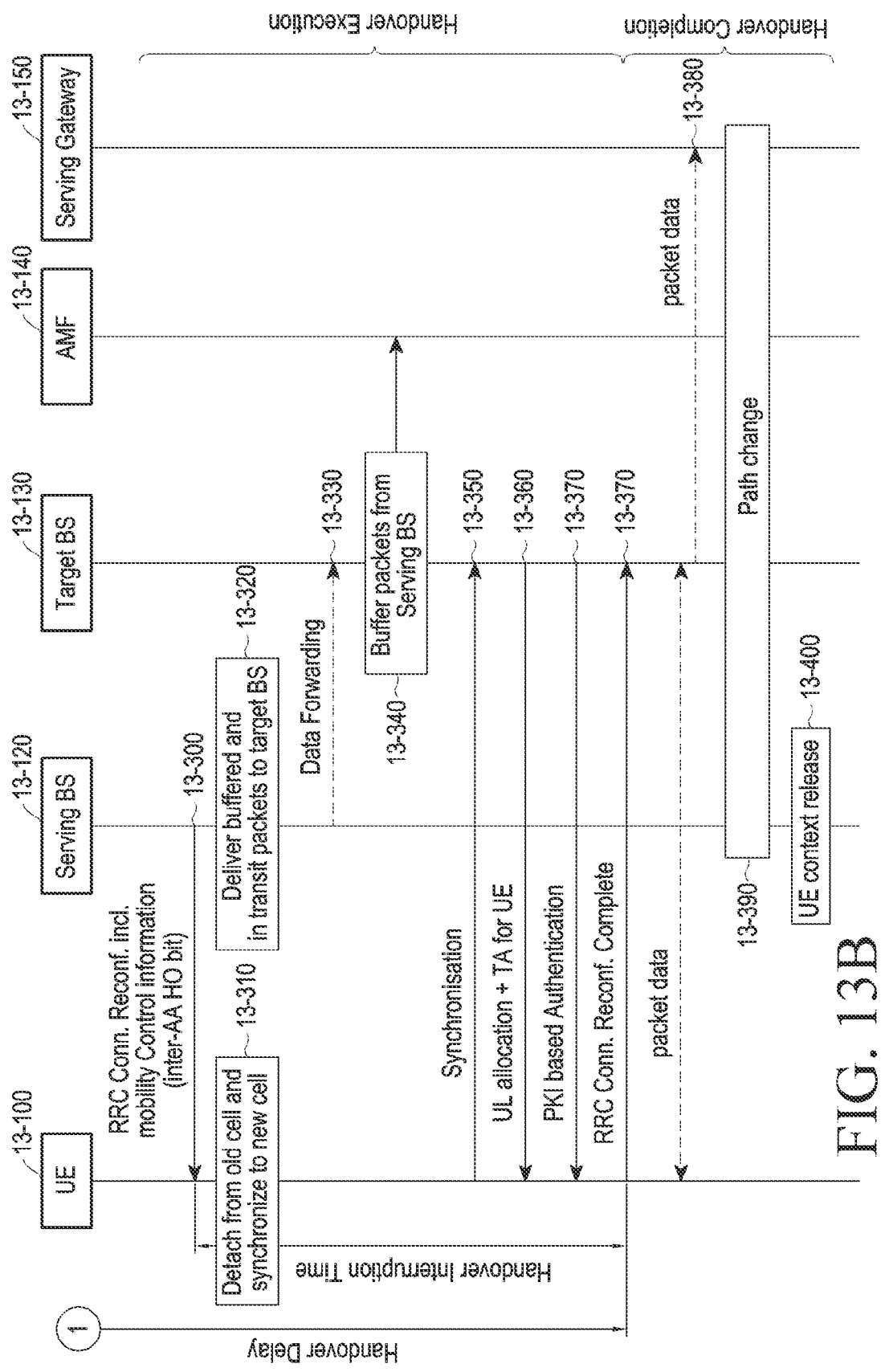

FIGS. 13A and 13B illustrate the authentication procedure in handover of the UE according to another embodiment of the disclosure.

According to FIG. 13A, a serving BS 13-120 may configure a UE 13-100 to allow authentication with another BS. When receiving a message for allowing authentication with another BS from the serving BS 13-120, the UE 13-100 identifies a BS required to be authenticated on the basis of authentication area (AA) information transmitted by BSs. The UE 13-100 performs authentication with a BS having an AA different from that of the serving BS 13-120. During a process in which the UE 13-100 transmits a message for authentication with a target BS 13-130, the serving BS 13-120 may forward the message through an AMF 13-140. A computing node (CN) refers to a base station, a BS, and a target to be authenticated, and a detailed process is described below.

The serving BS 13-120 transmits measurement control 13-210. The measurement information provided by the serving BS 13-120 is used for controlling mobility of the UE 13-100. Thereafter, according to normal communication, data communication (packet data) 13-220 is performed. The UE 13-100 measures the strength of radio signals of cells of neighbor BSs in measurement operation 13-230 and, when a condition is satisfied with the measurement control 13-210, transmits a measurement report 13-235 to the serving BS 13-120. Whether to allow the UE 13-100 with another BS is determined in operation 13-240. The serving BS 13-120 sets a bit for allowing the UE 13-100 to perform authentication with another BS in an RRC connection reconfiguration message and transmits the RRC connection reconfiguration message to the UE 13-100 in operation 13-245.

The UE 13-100 receives AA information transmitted by BSs and identifies whether the BSs belong to AAs different from the AA of the serving BS in operation 13-250. The UE 13-100 and the target BS 13-130 perform PKI-based authentication, and a detailed operation 13-255 is illustrated in FIGS. 17 to 21.

During a process in which the UE 13-100 transmits a message for authentication with the target BS 13-130, the serving BS 13-120 may forward the message through the AMF 13-140 in operation 13-255. The UE 13-100 measures the strength of radio signals of cells of neighbor BSs in measurement operation 13-260 and, when a condition is satisfied with the measurement control 13-210, transmits a measurement report 13-260 to the serving BS 13-120. When receiving the measurement report 13-260, the serving BS 13-120 determines handoff of the UE 13-100 and identifies whether the serving BS 13-120 belongs to an AA which is the same as that of the target BS 13-130 in operation 10-265.

The serving BS 13-120 may transmit, to the target BS 13-130, a message of a handover request 13-270 for transferring information required for preparing the handoff to the target BS 13-130. The target BS 13-130 performs admission control 13-280 for determining whether to allow the handover. During the process, the target BS 13-130 configures resources required for connecting the UE 13-100 to the target BS 13-130. When HO preparation is completed, the target BS 13-130 transmits handover request ack (acknowledgement) 13-290 including information required by the UE 13-100 for the connection to the target BS 13-130. The handover request ack message includes radio connection reconfiguration message information received from the target BS 13-130, and the serving BS 13-120 transmits an RRC connection reconfiguration message 13-300 including the radio connection reconfiguration message information received from the target BS 13-130 to the UE 13-100.

The serving BS 13-100 configures an inter-AA HO bit (or inter-AA HO information) in the RRC connection reconfiguration message 13-300 to inform that the serving BS and the target BS belong to different AAs and thus the UE 13-100 needs PKI authentication and configures a PKI fwd bit to inform that authentication with the target BS 13-130 can be performed through the serving BS 13-120 in operation 13-230. When the UE 13-100 receives the RRC connection reconfiguration message 13-200 including the parameter required for the handover and the inter-AA HO bit (or inter-AA HO information)/PKI fwd bit, the UE 13-100 and the target BS 13-130 may perform PKI-based authentication, but do not need to perform authentication if authentication has been performed in advance in operation 13-300. The UE 13-100 detaches from the previous cell and performs synchronization 13-310 for access to a new cell. Further, the serving BS 13-120 transmits a received packet to the target BS 13-130 in operations 13-320 and 13-330. The target BS 13-130 receives the packet from the serving BS 13-120.

The UE 13-100 performs synchronization 13-350 for the target BS and accesses the target BS through a RACH. The target BS 13-130 allocates UL and responds through TA in operation 13-360. The UE 13-100 transmits RRC connection reconfiguration complete 13-370 and indicates completion of the handover. Thereafter, the UE 13-100 may receive packet data through the target BS in operation 13-380. The target BS 13-130 makes a path change 13-390 in a network (MME or the like) in order to inform that the UE has been handed over. When receiving a UE context release message from the network, the serving BS 13-120 performs UE context release 13-400.

The UE 13-100 and the target BS 13-130 share an AS section encryption key by using the generated key after the PKI-based authentication.

Figure 14A:
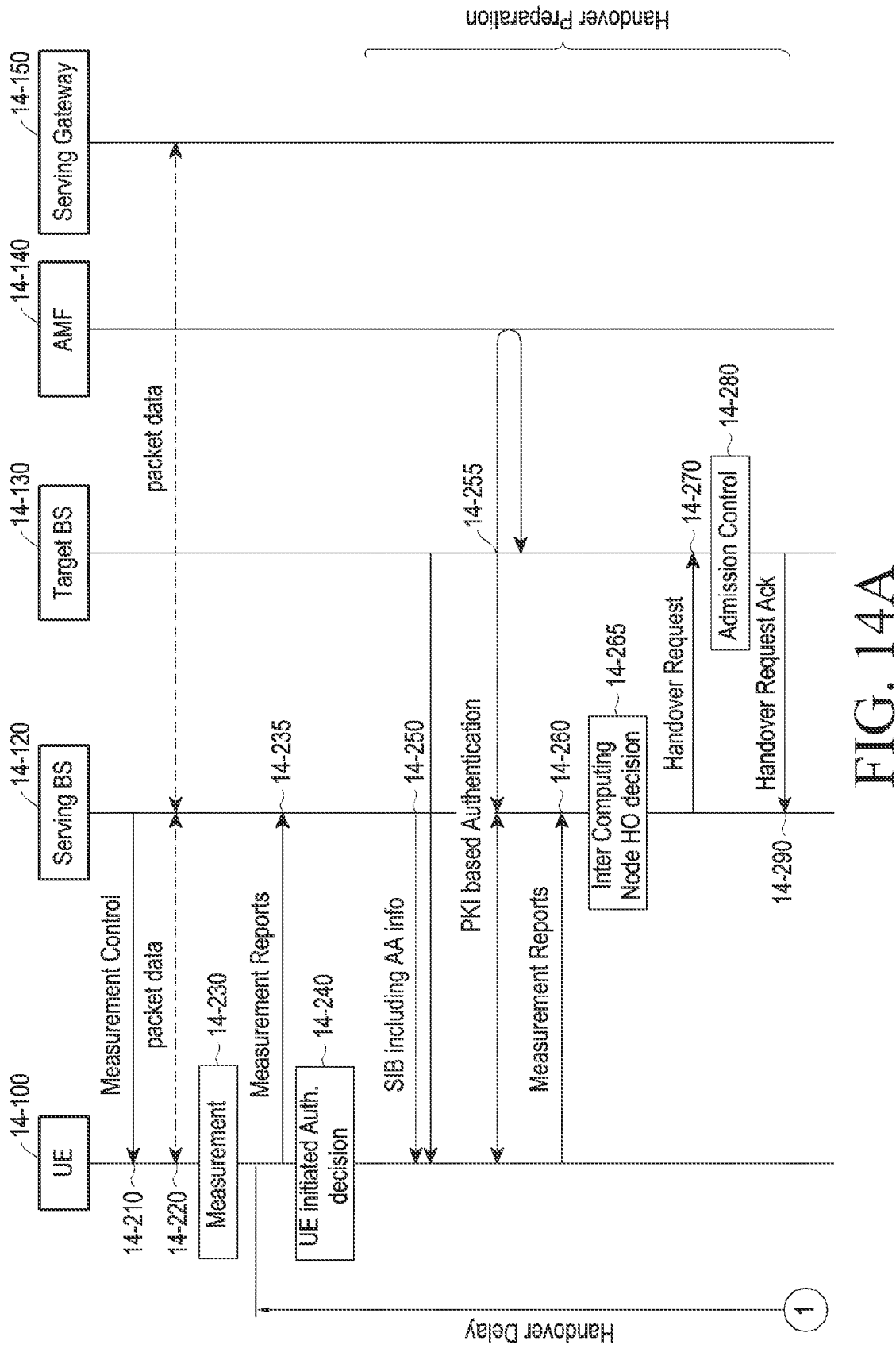
FIGS. 14A and 14B illustrate the authentication procedure in handover of the UE according to another embodiment of the disclosure.
Figure 14B:
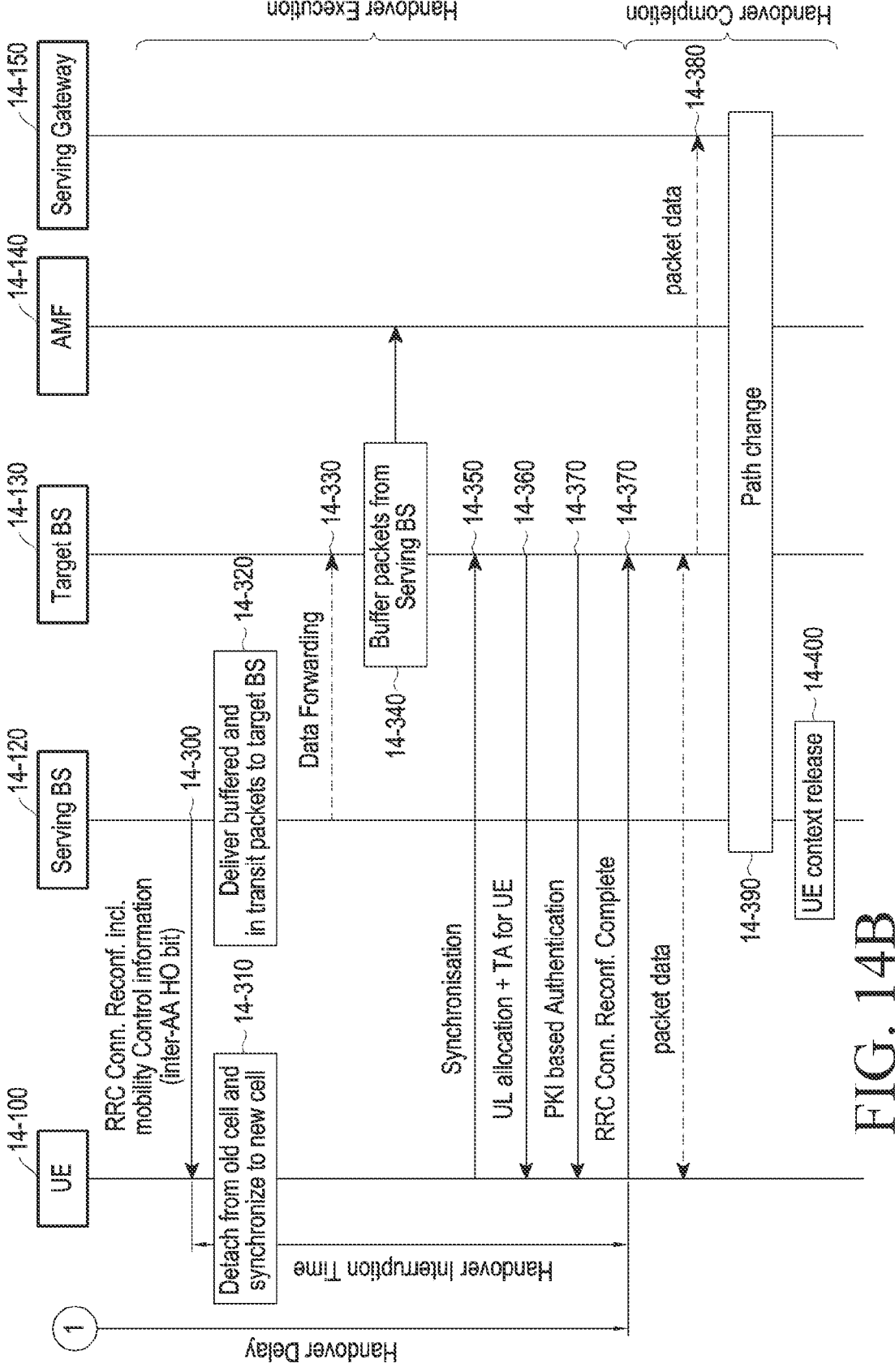

FIGS. 14A and 14B illustrate the authentication procedure in handover of the UE according to another embodiment of the disclosure.

According to FIG. 14A, a UE 14-100 identifies a BS required to be authenticated on the basis of authentication area (AA) information transmitted by BSs. The UE 14-100 performs authentication with a BS having an AA different from that of the serving BS 14-120. A computing node (CN) refers to a base station, a BS, and a target to be authenticated, and a detailed process is described below.

The serving BS 14-120 transmits measurement control 14-210. The measurement information provided by the serving BS 14-120 is used for controlling mobility of the UE 14-100. Thereafter, according to normal communication, data communication (packet data) 14-220 is performed. The UE 14-100 measures the strength of radio signals of cells of neighbor BSs in measurement operation 14-230 and, when a condition is satisfied with the measurement control 14-210, transmits a measurement report 14-235 to the serving BS 14-120. The UE 14-100 determines whether to allow authentication with another BS in operation 14-240. The UE 14-100 receives AA information transmitted by BSs and identifies whether the BSs belong to AAs different from the AA of the serving BS 14-120 in operation 14-250.

The UE 14-100 and the target BS 14-130 perform PKI-based authentication, and a detailed operation 14-255 is illustrated in FIGS. 17 to 21. During a process in which the UE 14-100 transmits a message for authentication with the target BS 14-130, the serving BS 14-120 may forward the message through the AMF 14-140 in operation 14-255.

The UE 14-100 measures the strength of radio signals of cells of neighbor BSs in measurement operation 14-260 and, when a condition is satisfied with the measurement control 14-210, transmits a measurement report 14-260 to the serving BS 14-120. When receiving the measurement report 14-260, the serving BS 14-120 determines handoff of the UE 14-100 and identifies whether the serving BS 14-120 belongs to an AA which is the same as that of the target BS 14-130 in operation 14-265. The serving BS 14-120 may transmit, to the target BS 14-130, a message of a handover request 14-270 for transferring information required for preparing the handoff to the target BS 14-130. The target BS 14-130 performs admission control 14-280 for determining whether to allow the handover. During the process, the target BS 14-130 configures resources required for connecting the UE 14-100 to the target BS 14-130. When HO preparation is completed, the target BS 14-130 transmits handover request ack (acknowledgement) 14-290 including information required by the UE 14-100 for the connection to the target BS 14-130. The handover request ack message includes radio connection reconfiguration message information received from the target BS 14-130, and the serving BS 14-120 transmits an RRC connection reconfiguration message 14-300 including the radio connection reconfiguration message information received from the target BS 14-130 to the UE 14-100.

The serving BS 14-120 configures an inter-AA HO bit (or inter-AA HO information) in the RRC connection reconfiguration message 14-300 to inform that the serving BS 14-120 and the target BS 14-130 belong to different AAs and thus the UE 14-100 needs PKI authentication and configures a PKI fwd bit to inform that authentication with the target BS 14-130 can be performed through the serving BS 14-120 in operation 14-230. When the UE 14-100 receives the RRC connection reconfiguration message 14-200 including the parameter required for the handover and the inter-AA HO bit (or inter-AA HO information)/PKI fwd bit, the UE 14-100 and the target BS 14-130 may perform PKI-based authentication, but do not need to perform authentication if authentication has been performed in advance in operation 14-300.

The UE 14-100 detaches from the previous cell and performs synchronization 14-310 for access to a new cell. Further, the serving BS 14-120 transmits a received packet to the target BS 14-130 in operations 14-320 and 14-330. The target BS 14-130 receives the packet from the serving BS 14-120. The UE 14-100 performs synchronization 14-350 for the target BS 14-130 and accesses the target BS 14-130 through a RACH. The target BS 14-130 allocates UL and responds through TA in operation 14-360. The UE 14-100 transmits RRC connection reconfiguration complete 14-370 and indicates completion of the handover. Thereafter, the UE 14-100 may receive packet data through the target BS in operation 14-380. The target BS 14-130 makes a path change 14-390 in a network (MME or the like) in order to inform that the UE 14-100 has changed the cell. When receiving a UE context release message from the network, the serving BS 14-120 performs UE context release 14-400.

The UE 14-100 and the target BS 14-130 share an AS section encryption key by using the generated key after the PKI-based authentication.

Figure 15:
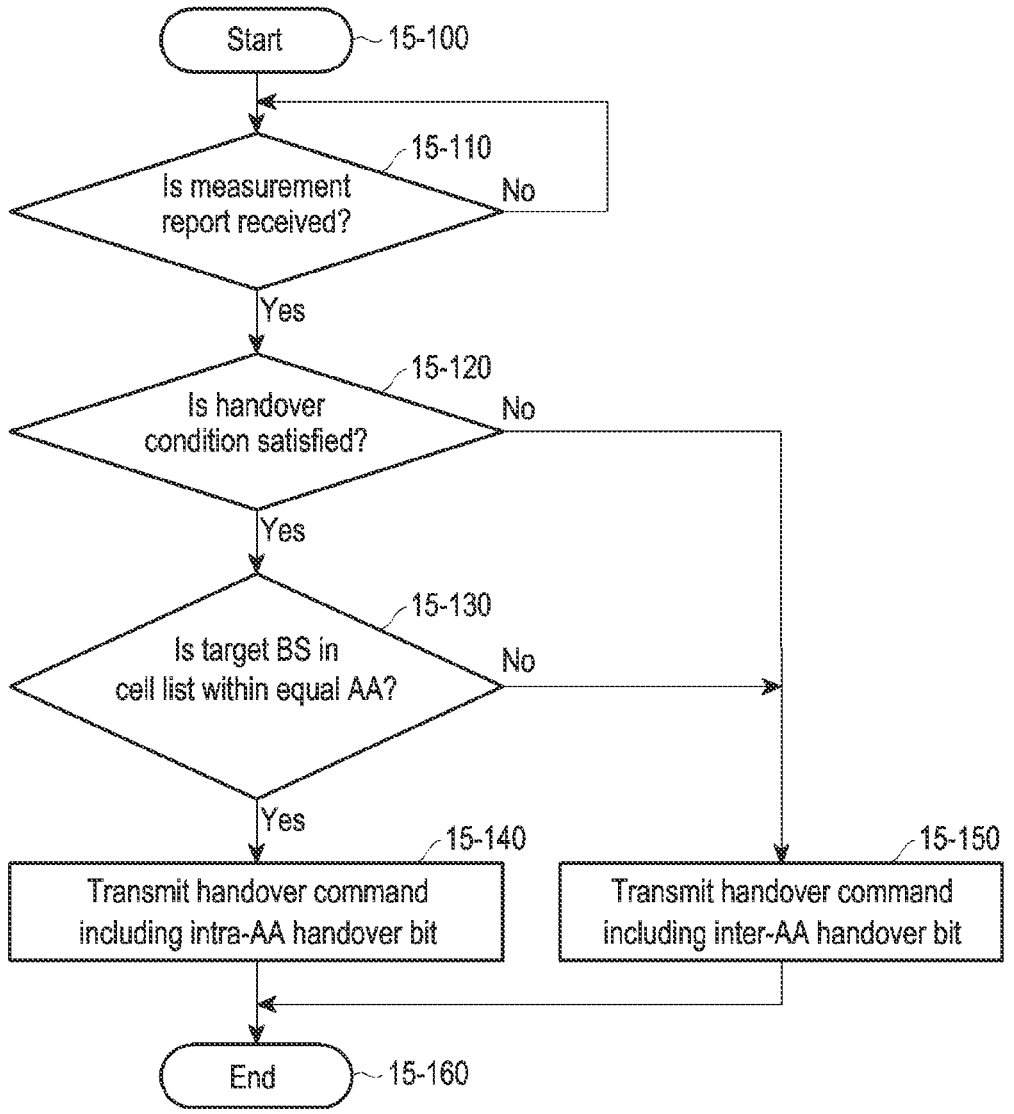
FIG. 15 illustrates a handover command procedure of the BS according to an embodiment of the disclosure.

FIG. 15 illustrates a handover command procedure of the BS according to an embodiment of the disclosure.

Referring to FIG. 15, when receiving a measurement report 15-110 from the UE, the BS identifies whether a handover condition is satisfied in operation 15-120. When the handover condition is satisfied in operation 15-120, the corresponding BS identifies whether the BS belong to an AA which is the same as that of the BS subject to the handover in operation 15-130. When the BSs belong to the same AA, the BS sets an intra-AA handover bit and transmits a handover command to the UE in operation 15-140. When the BSs do not belong to the same AA, the BS sets an inter-AA handover bit (or inter-AA HO information) and transmits a handover command in operation 15-150.

Figure 16:
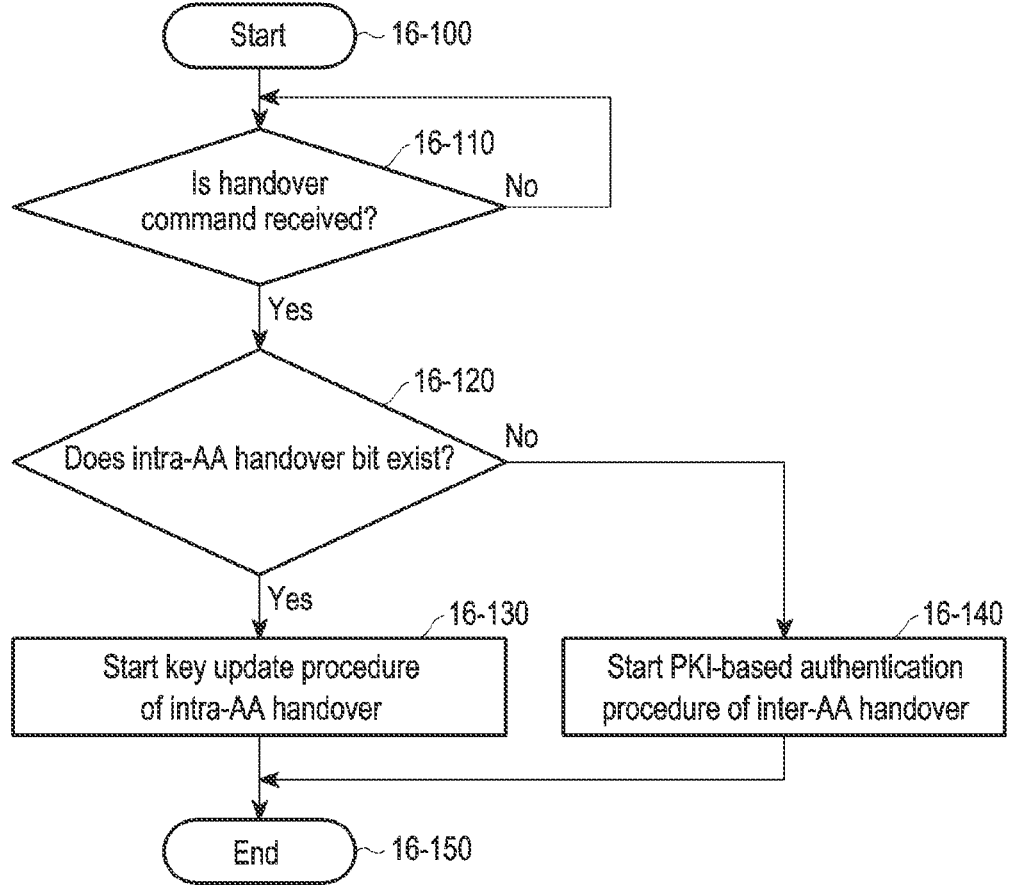
FIG. 16 illustrates a handover procedure of the UE according to an embodiment of the disclosure.

FIG. 16 illustrates a handover procedure of the UE according to an embodiment of the disclosure.

Referring to FIG. 16, the UE identifies whether a handover command is received from the BS in operation 16-110. When receiving the handover command, the UE identifies an intra-AA handover bit (or intra-AA HO information) in operation 16-120. When there is the intra-AA handover bit (or intra-AA HO information), intra-AA handover is performed in operation 16-130. When there is no intra-AA handover bit (or intra-AA HO information) or when there is an inter-AA handover bit (or inter-AA HO information), inter-AA handover including a PKI-based authentication procedure is performed in operation 16-140.

Figure 17:
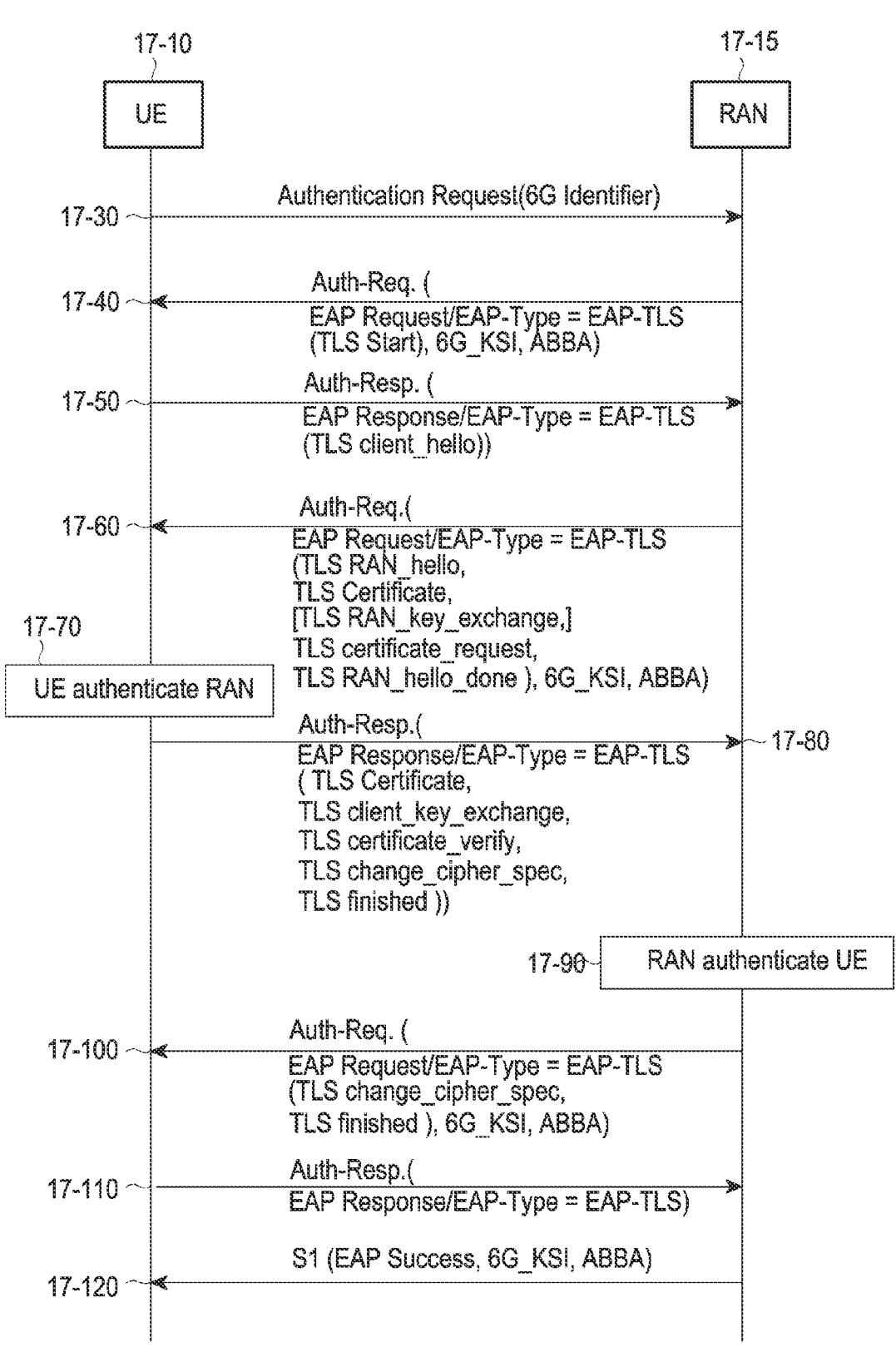
FIG. 17 illustrates a procedure in which PKI-based authentication is performed when the UE configures a connection with the RAN according to an embodiment.

FIG. 17 illustrates a procedure in which the UE performs public key infrastructure (PKI)-based authentication when the UE configures a connection with the BS according to an embodiment of the disclosure.

FIG. 17 illustrates a procedure in which the UE of the disclosure performs mutual authentication with the BS.

In FIG. 17, a UE 17-10 may first transmit an authentication request message including its own 6G identifier to a RAN 17-15 to access the RAN 17-15 in operation 17-30.

After receiving the authentication request message from the UE 17-10, the RAN 17-15 may transmit a message (Auth-Req.) making a request for authenticating EAP-TLS (TLS start) for the RAN 17-15 in operation 17-40. The RAN 17-15 may insert a 6G key set identifier (6G_KSI) corresponding to an identifier of the corresponding authentication and an anti-bidding down between architectures (ABBA) parameter for preventing bidding down of a security feature from higher release to lower release into the authentication request message (Auth-Req) and transmit the authentication request message in operation 17-40.

When receiving the TLS start information from the RAN 17-15, the UE 17-10 may transmit an authentication response message (Auth-Resp.) including TLS client_hello information to the RAN 17-15 in operation 17-50. The TLS client_hello information may be a random value (or a client seed value) for preventing people who are not authorized to communicate from wiretapping.

When receiving the TLS client_hello information included in the authentication response message (Auth-Resp.) from the UE 17-10, the RAN 17-15 may transmit an authentication request message (Auth-Req.) including at least one of TLS RAN_hello, TLS Certificate (RAN certificate), TLS RAN_key_exchange (temporary session key), TLS certificate_request (whether a UE certificate is requested), TLS RAN_hello_done information, 6G KSI, and ABBA to the UE 17-10 in operation 17-60. The TLS RAN_hello information may include a random value (or a RAN seed value) for preventing people who are not authorized to communicate from wiretapping. The TLS RAN_key_exchange information may include a temporary session key (PreMasterSecret) for preventing man in the middle (MITM).

At this time, unless a TLC emergency call is used, the RAN 17-15 may set certificate_request and verify a UE certificate. The UE 17-10 may identify a RAN certificate (TLS Certificate) included in the authentication request message (Auth-Req.) of the RAN 17-15 and perform authentication whether the RAN certificate (TLS Certificate) is a legal certificate in operation 17-70. The UE 17-10 may identify an expiration date of the RAN certificate (TLS Certificate), inspect validity of the RAN certificate (TLS Certificate), and identify the content of the RAN certificate (TLS Certificate). The UE 17-10 may inspect the RAN certificate (TLS Certificate) by checking whether there is cancellation of certificate issuance, illegal issuance, certificate error, secret key exposure, or the like.

A procedure in which the UE 17-10 authenticates the RAN certificate is described in detail with reference to the following drawings.

After identifying that there is no error in the certificate of the RAN 17-15, the UE 17-10 may transmit an authentication response message (Auth-Resp.) including at least one of TLS Certificate (UE certificate), TLS client_key_exchange (temporary session key), TLS certificate_verify, TLS change_cipher_spec (available chipper spec information), and TLS finish information to the RAN in response to the identification in operation 17-80. The TLS client_key_exchange information may include a temporary session key (PreMasterSecret) for preventing man in the middle (MITM).

According to an embodiment, the UE 17-10 may encrypt the temporary session key (TLS client_key_exchange) through an RAN public key and transmit the session key to the RAN 17-15.

After receiving the certificate of the UE 17-10, the RAN 17-15 identifies the certificate of the UE 17-10 in operation 17-90. The RAN 17-15 may identify an expiration date of the RAN certificate (TLS Certificate), inspect validity of the UE certificate (TLS Certificate), and identify the content of the UE certificate (TLS Certificate). The RAN 17-15 may inspect validity of the UE certificate (TLS Certificate) by checking whether there is cancellation of certificate issuance, illegal issuance, certificate error, secret key exposure, or the like.

The RAN 17-15 may identify the certificate of the UE 17-10, select an appropriate one of the cipher specs transmitted by the UE 17-10, specify the same in TLS change_cipher_spec, and transmit an authentication request message (Auth-Req.) including TLS finished information to the UE 17-10 in operation 17-100. The authentication request message (Auth-Req.) may include 6G KSI and ABBA information in operation 17-100.

The UE 17-10 may transmit an authentication response message (Auth-Resp) to the RAN 17-15 as a response message of the authentication request message (Auth-Req.) in operation 17-110. The RAN 17-15 may use most significant 256 (128) bits of EMSK generated at this time as a session key (gNB key). A pseudo-random function (PRF) may be used when EMSK is generated and, for example, hash-based RFC4306 may be generated using RFC4306 through parameters including the first random value, the second random value, and the temporary session key (PreMasterSecret). The authentication response message (Auth-Resp) may include an EAP response and an EAP type (EAP-TLS).

The RAN 17-15 may transmit an EAP success message, which indicates normal authentication with the UE 17-10 (EAP success), includes 6G-KSI and ABBA parameters, and induces the gNB key, to the UE 17-10 in operation 17-120.

When receiving the EAP success message, like the RAN 17-15, the UE 17-10 may use most significant 256 (128) bits of EMSK as the session key (gNB key).

That is, the UE 17-10 may generate a session key by using the temporary session key (TLS client_key_exchange) and information required for authentication. A pseudo-random function (PRF) may be used when EMSK is generated and, for example, hash-based RFC4306 may be generated using RFC4306 through parameters including the first random value, the second random value, and the temporary session key (PreMasterSecret). The RAN 17-15 may generate a session key by using the temporary session key (TLS client_key_exchange) and information required for authentication. According to an embodiment, after the session key is generated, the RAN 17-15 and the UE 17-10 may discuss an encryption algorithm.

Figure 18A:
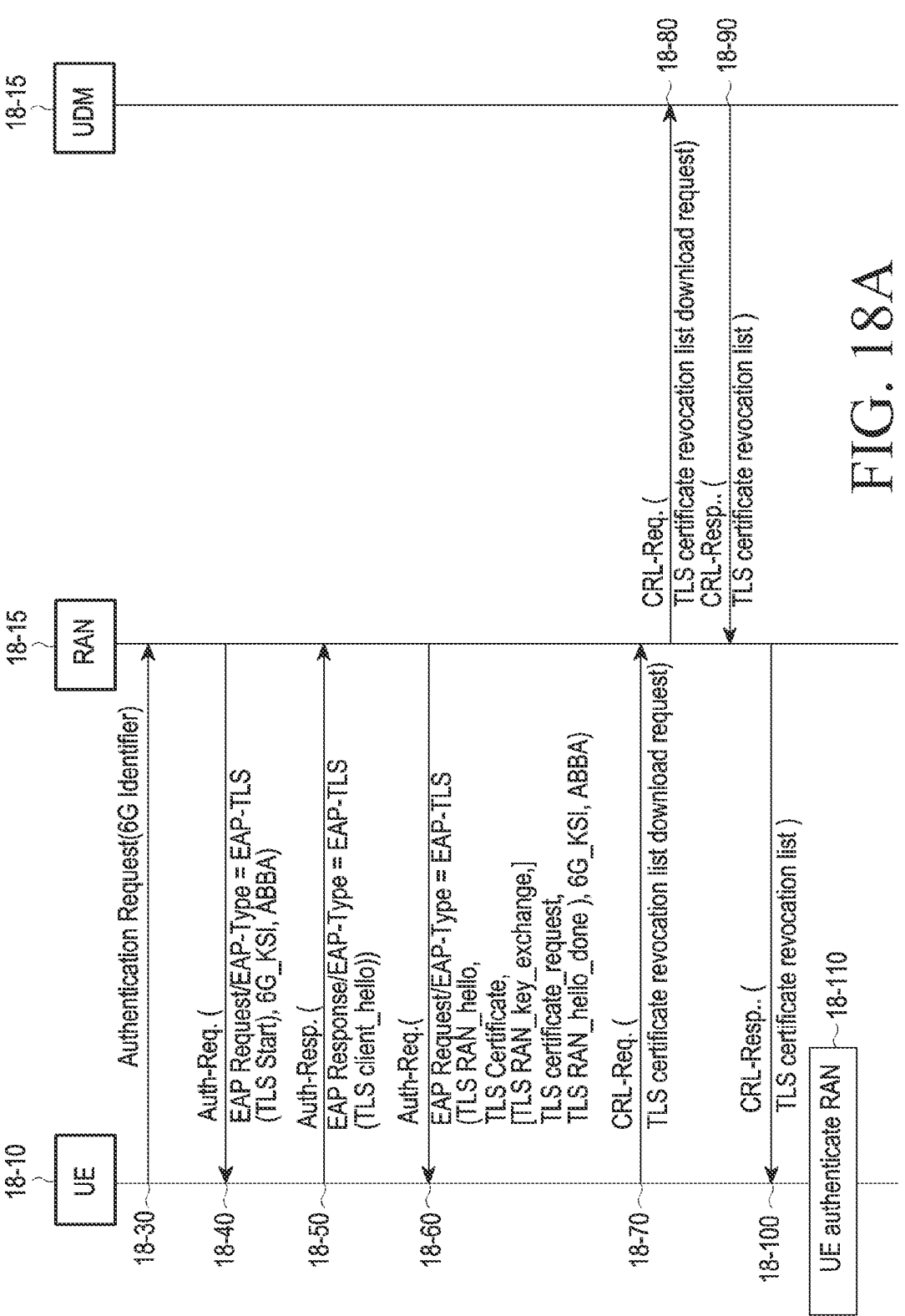
FIGS. 18A and 18B illustrate a procedure in which validity of a certificate is identified when the UE performs PKI-based authentication with the RAN according to an embodiment of the disclosure.
Figure 18B:
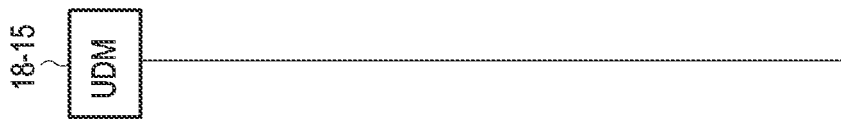
Figure 18B:
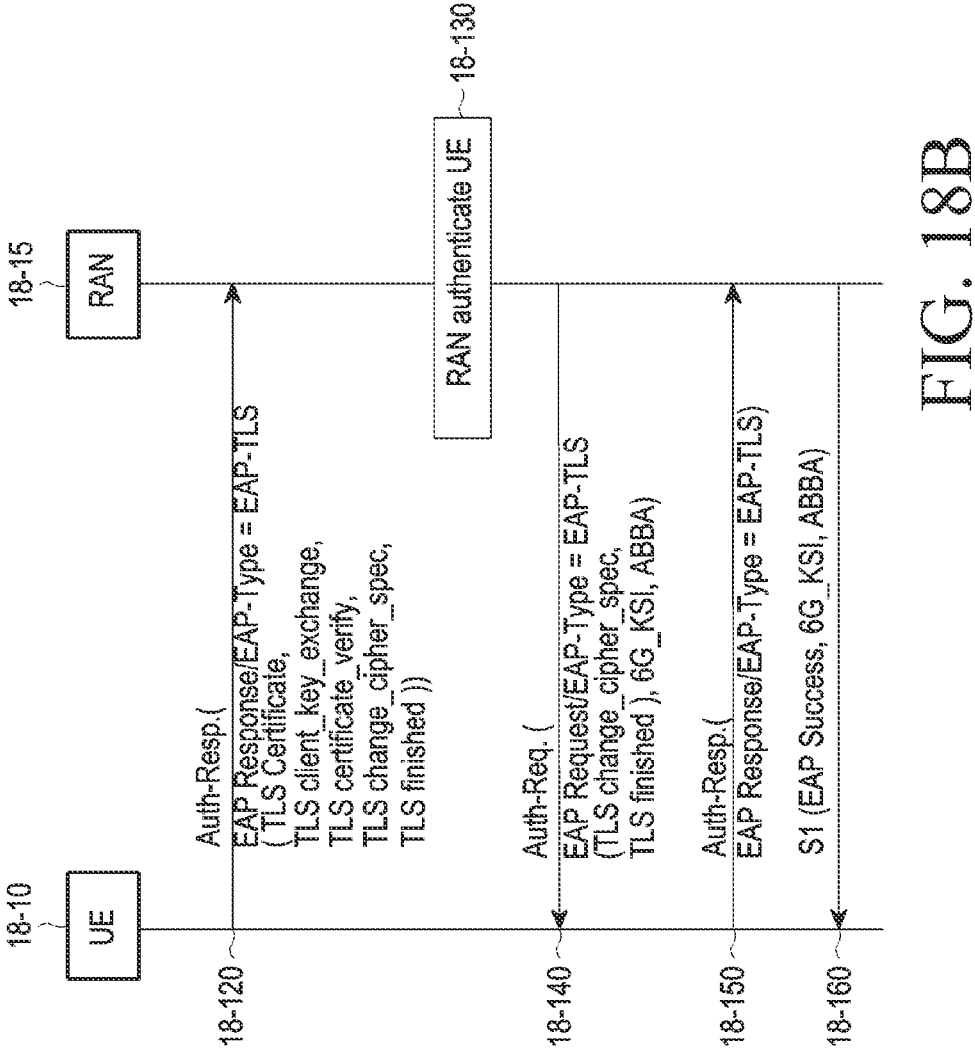

FIGS. 18A and 18B illustrate a procedure in which validity of a certificate is identified when the UE performs PKI-based authentication with the RAN according to an embodiment of the disclosure.

In the embodiment illustrated in FIGS. 18A and 18B, an operation of downloading a credential revocation list (CRL) during a mutual authentication process and identifying whether the CRL includes a certificate of the corresponding RAN (or a certificate of the corresponding UE) is proposed. At this time, since a UE 18-10 cannot perform communication and thus cannot make a request for the CRL to a network entity (for example, a certificate authority (CA) server), a procedure in which a RAN 18-15 forwards (or allows) the CRL request message of the UE 18-10 to the network is needed.

The UE 18-10 may first transmit an authentication request message including its own 6G identifier to the RAN 18-15 to access the RAN 18-15 in operation 18-30. After receiving the authentication request message from the UE 18-10, the RAN 18-15 may transmit a message (Auth-Req.) making a request for authenticating EAP-TLS (TLS start) for the RAN 18-15 to the UE 18-10 in operation 18-40. The RAN 18-15 may insert a 6G key set identifier (6G_KSI) corresponding to an identifier of the corresponding authentication and an anti-bidding down between architectures (ABBA) parameter for preventing bidding down of a security feature from higher release to lower release into the authentication request message (Auth-Req) and transmit the authentication request message in operation 18-40.

When receiving the TLS start information from the RAN 18-15, the UE 18-10 may transmit an authentication response message (Auth-Resp.) including TLS client_hello information to the RAN 18-15 in operation 18-50.

When receiving the TLS client_hello information included in the authentication response message (Auth-Resp.) from the UE 18-10, the RAN 18-15 may transmit an authentication request message (Auth-Req.) including at least one of TLS RAN_hello, TLS Certificate (RAN certificate), TLS RAN_key_exchange, TLS certificate_request (whether a UE certificate is requested), TLS RAN_hello_done information, 6G KSI, and the ABBA parameter to the UE in operation 18-60.

At this time, unless a TLS emergency call is used, the RAN 18-15 may set certificate_request and verify a UE certificate. The UE 18-10 should verify the RAN certificate included in the authentication request message of the RAN 18-15. Even though the RAN certificate is legally signed by the CA, the RAN certificate may be revoked thereafter, so that the UE 18-10 needs additional confirmation.

Accordingly, the UE 18-10 should receive a credential revocation list (CRL) in which whether the RAN certificate was revoked is recorded from CA including the content of the RAN certificate or a server designated for verifying the certificate by the CA.

In order to transfer a CRL request message (CRL-req) to unified data management (UDM) 18-30 for receiving the CRL for the RAN certificate, the UE 18-10 may transmit the CRL request message (CRL-req (TLS certificate revocation list download request)) to the RAN 18-15 in operation 18-70.

When receiving the CRL request message (CRL-req), the RAN 18-15 should basically reject NAS communication of the UE 18-10 since the UE 18-10 has not yet been authenticated. However, the RAN 18-15 may exceptionally allow transmission of the CRL request message (CRL-req). The RAN 18-15 may forward the corresponding CRL request message (CRL-req (TLS certificate revocation list download request)) to a network entity (NE) serving as CA of the RAN certificate, that is, the UDM 18-20 herein in operation 18-80. During the process, the UE 18-10 may determine whether to forward the corresponding CRL request message (CRL-req) to the server serving as CA which the RAN 18-15 knows on the basis of a message included in a packet such as an IP or current information of the UE.

The UDM 18-20 may identify the CRL request message (CRL-Req) received from the UE 18-10 and transmit a CRL response message (CRL-Resp (TLS certificate revocation list)) including CRL information to the RAN 18-15 in order to transmit CRL information requested by the UE 18-10 in operation 18-90. The RAN 18-15 may forward the CRL response message (CRL-Resp(TLS certificate revocation list)) including the CRL information to the UE 18-10 in operation 18-100.

The UE 18-10 may identify the RAN certificate included in the authentication request message of the RAN 18-15 and identify whether the RAN certificate is a legal certificate in operation 18-110.

After identifying that there is no error in the certificate of the RAN 18-15, the UE 18-10 may transmit an authentication response message (Auth-Resp.) including at least one of TLS Certificate (UE certificate), TLS client_key_exchange, TLS certificate_verify, TLS change_cipher_spec (available chipper spec information), and TLS finish information to the RAN in response to the identification in operation 18-120. After receiving the certificate of the UE 18-10, the RAN 18-15 may identify the certificate of the UE 18-10 in operation 18-130.

According to an embodiment, a procedure of receiving the credential revocation list (CRL) of the UE certificates from the UDM 18-20 may be performed between operation 18-120 and operation 18-130.

In order to receive the CRL for the UE certificate, the RAN 18-15 may transmit the CRL request message (CRL-req) for the UE certificate to a network entity (NE) serving as CA of the UE certificate, that is, the UDM 18-20 herein. The UDM 18-20 may transmit a CRL response message (CRL-Resp) including CRL information for the UE certificate to the RAN 18-15. Thereafter, the RAN 18-15 may identify the CRL information for the UE certificate and identify whether the UE certificate is revoked.

The RAN 18-15 may identify the certificate of the UE 18-10, select an appropriate one of the cipher specs transmitted by the UE 18-10, specify the same in TLS change_cipher_spec. and transmit an authentication request message (Auth-Req.) including TLS finished information to the UE 18-10 in operation 18-140. The authentication request message may also include 6G KSI and ABBA information.

The UE 8-10 may transmit an empty authentication response message (Auth-Resp) to the RAN 18-15 as a response message of the authentication request message in operation 5-150. The RAN 18-15 uses most significant 256 (128) bits of EMSK generated at this time as a gNB key. The RAN 18-15 may transmit an EAP success message indicating normal authentication with the UE 18-10 (EAP success) and inducing the gNB key in operation 18-160. When receiving the EAP success, like the RAN 18-15, the UE 18-10 may use most significant 256 (128) bits of EMSK as the gNB key.

FIGS. 19A and 19B illustrate the procedure in which validity of a certificate is identified when the UE performs PKI-based authentication with the RAN according to another embodiment of the disclosure.

In the embodiment illustrated in FIGS. 19A and 19B, it may be identified whether the corresponding certificate (RAN certificate or the UE certificate) is revoked through an online certificate status protocol (OCSP) during the mutual authentication process. At this time, since a UE 19-10 cannot perform communication and thus cannot make a request for the OCSP to the CA, the RAN 19-15 may perform a procedure of allowing communication for the OSCP request message (OSCP-Req) of the UE 19-10.

The UE 19-10 may first transmit an authentication request message including its own 6G identifier to the RAN 19-15 to access the RAN 19-15 in operation 19-30. After receiving the authentication request message from the UE 19-10, the RAN 19-15 may transmit a message (Auth-Req.) making a request for authenticating EAP-TLS (TLS start) for the RAN 19-15 to the UE 5-10 in operation 19-40.

The RAN 19-15 may insert a 6G key set identifier (6G_KSI) corresponding to an identifier of the corresponding authentication and an anti-bidding down between architectures (ABBA) parameter for preventing bidding down of a security feature from higher release to lower release into the authentication request message (Auth-Req) in operation 19-40.

When receiving the TLS start information from the RAN 19-15, the UE 19-10 may transmit an authentication response message (Auth-Resp.) including TLS client_hello information to the RAN 19-15 in operation 19-50.

When receiving the TLS client_hello information included in the authentication response message (Auth-Resp.) from the UE 19-10, the RAN 19-15 may transmit an authentication request message (Auth-Req.) including at least one of TLS RAN_hello, TLS Certificate (RAN certificate). TLS RAN_key_exchange, TLS certificate_request (whether a UE certificate is requested), TLS RAN_hello_done information, 6G KSI, and the ABBA parameter to the UE 19-10 in operation 19-60. At this time, unless a TLC emergency call is used, the RAN 19-15 may set certificate_request and verify a UE certificate.

The UE 19-10 should verify the RAN certificate included in the authentication request message of the RAN 19-15. Even though the RAN certificate is legally signed by the CA, the RAN certificate may be revoked thereafter, so that the UE 19-10 needs confirmation for revocation of the RAN certificate. The UE 19-10 may make a request for a response to the online certificate status protocol (OCSP) which is a protocol for identifying in real time whether the corresponding RAN certificate is revoked to the CA included in the content of the certificate or a predetermined server designated for verifying the certificate by the CA.

In order to identify in real time whether the corresponding RAN certificate is revoked from the UDM 19-20, the UE 19-10 may transmit an OSCP request message (OSCP-req (TLS certificate status request)) to the RAN 19-15 in operation 19-70.

When receiving the OSCP request message (OSCP-req) from the UE 19-10, the RAN 19-15 should basically reject NAS communication of the UE 19-10 since the UE 19-10 has not yet been authenticated. However, the OSCP request message does not correspond to normal data transmission, and thus the RAN 19-15 may exceptionally allow the transmission.

The RAN 19-15 may forward the corresponding OSCP request message (O-req (TLS certificate status request)) to an NE serving as the CA of the RAN certificate, that is, UDM 19-20 herein in operation 19-80. During the process, the UE 19-10 may determine whether to forward the corresponding OSCP request message to the server serving as the CA which the RAN 19-15 knows on the basis of a message included in a packet such as an IP or current information of the UE.

The UDM 19-20 may identify the OSCP request message received from the UE 19-10 and transmit an OSCP response message (OSCP-Resp) including RAN certificate status information (TLS certificate status response) requested by the UE 19-10 to the RAN 19-15 in operation 19-90. The RAN 19-15 may retransmit the corresponding OSCP response message (OSCP-Resp (TLS certificate status response)) to the UE 19-10 in operation 19-100.

The UE 19-10 identifies the RAN certificate included in the authentication request message of the RAN 19-15 and identifies whether the RAN certificate is a legal certificate in operation 19-110.

After identifying that there is no error in the certificate of the RAN 19-15, the UE 19-10 may transmit an authentication response message (Auth-Resp) including at least one of TLS Certificate (UE certificate), TLS client_key_exchange, TLS certificate_verify, TLS change_cipher_spec (available chipper spec information), and TLS finish information to the RAN 19-15 in operation 19-120.

According to an embodiment, a procedure of identifying whether the UE certificate is revoked through an online certificate status protocol (OCSP) for the UE certificate may be performed between operation 19-120 and operation 19-130.

In order to identify in real time whether the UE certificate is revoked from the UDM 19-20, the RAN 19-15 may transmit the OSCP request message (TLS certificate status request) for the UE certificate to the NE serving as the CA of the RAN certificate, that is, the UDM 19-20 herein. The UDM 19-20 may transmit an OSCP response message including the UE certificate status information (TLS certificate status response) requested by the RAN 19-15 to the RAN 19-15. Thereafter, the RAN 19-15 may identify whether the corresponding UE certificate is revoked on the basis of the UE certificate status information (TLS certificate status response).

The RAN 19-15 receives the certificate of the UE 19-10 and identifies the certificate of the UE 19-10 in operation 19-130. The RAN 19-15 may identify the certificate of the UE 19-10, select an appropriate one of the cipher specs transmitted by the UE 19-10, specify the same in TLS change_cipher_spec, and transmit an authentication request message (Auth-Req.) including TLS finished information to the UE 19-10 in operation 19-140. The authentication response message may include 6G KSI and ABBA information in operation 19-140. The UE 19-10 may transmit an empty Auth-Resp message to the RAN as a response message thereof in operation 19-150. The RAN 19-15 uses most significant 256 (128) bits of EMSK generated at this time as a gNB key.

The RAN 19-15 may transmit an EAP success message indicating normal authentication with the UE 19-10 (EAP success) and inducing the gNB key to the UE 19-10 in operation 19-160. When receiving the EAP success, like the RAN 19-15, the UE 19-10 may use most significant 256 (128) bits of EMSK as the gNB key.

FIGS. 20A and 20B illustrate the procedure in which validity of the certificate is identified when the UE and the RAN perform PKI-based authentication according to another embodiment of the disclosure.

In the embodiment illustrated in FIGS. 20A and 20B, an operation of downloading a credential revocation list (CRL) during a mutual authentication process and identifying whether the CRL includes a certificate of the corresponding RAN is proposed. At this time, since a UE 20-10 cannot perform communication and thus cannot make a request for the CRL to a network entity (for example, a certificate authority (CA) server), a procedure in which a RAN 20-15 forwards (or allows) the CRL request message of the UE 5-10 to the network is needed.

In the embodiment illustrated in FIGS. 20A and 20B, the UE 20-10 and UDM 20-20 directly transmit and receive CRL request/response messages in operations 20-140 to 20-150 after temporary mutual authentication between the UE 20-10 and the RAN 20-15.

The UE 20-10 may first transmit an authentication request message including its own 6G identifier to the RAN 20-15 to access the RAN 20-15 in operation 20-30.

After receiving the authentication request message from the UE 20-10, the RAN 20-15 may transmit a message (Auth-Req.) making a request for authenticating EAP-TLS (TLS start) for the RAN 20-15 to the UE 20-10 in operation 20-40.

The RAN 20-15 may insert a 6G key set identifier (6G_KSI) corresponding to an identifier of the corresponding authentication and an anti-bidding down between architectures (ABBA) parameter for preventing bidding down of a security feature from higher release to lower release into the authentication request message (Auth-Req) and transmit the authentication request message to the UE 20-10 in operation 20-40.

When receiving the TLS start information from the RAN 20-15, the UE 20-10 may transmit an authentication response message (Auth-Resp.) including TLS client_hello information to the RAN 20-15 in operation 20-50.

When receiving the TLS client_hello information included in the authentication response message (Auth-Resp.) from the UE 20-10, the RAN 20-15 may transmit an authentication request message (Auth-Req.) including at least one of TLS RAN_hello, TLS Certificate (RAN certificate), TLS RAN_key_exchange, TLS certificate_request (whether a UE certificate is requested), TLS RAN_hello_done information, 6G KSI, and the ABBA parameter to the UE 20-10 in operation 20-60.

At this time, unless a TLC emergency call is used, the RAN 20-15 may set certificate_request and verify a UE certificate. The UE 20-10 should verify the RAN certificate included in the authentication request message of the RAN 20-15. Even though the RAN certificate is legally signed by the CA, the RAN certificate may be revoked thereafter, so that confirmation therefor by the UE 20-10 is needed.

Accordingly, the UE 20-10 should receive a credential revocation list (CRL) in which whether the RAN certificate was revoked is recorded from CA including the content of the RAN certificate or a server designated for verifying the certificate by the CA. However, the UE 20-10 has not yet been authenticated and thus cannot perform both AS and NAS communication.

The UE 20-10 may temporarily perform authentication with only the RAN certificate without verifying whether the certificate is revoked in operation 20-70. After identifying that there is no error in the certificate of the RAN, the UE 20-10 may transmit an authentication response message including at least one of TLS Certificate (UE certificate), TLS client_key_exchange, TLS certificate_verify, TLS change_cipher_spec (available chipper spec information), and TLS finish information to the RAN 20-15 in response to the identification in operation 20-80.

The RAN 20-15 receives the certificate of the UE 20-10 and identifies the certificate of the UE 20-10 in operation 20-90. The RAN 20-15 may identify the certificate of the UE 20-10, select an appropriate one of the cipher specs transmitted by the UE 20-10, specify the same in TLS change_cipher_spec, and transmit an authentication request message including TLS finished information in operation 20-100. The authentication request message may also include 6G KSI and ABBA information in operation 20-100. The UE 20-10 may transmit an empty Auth-Resp message to the RAN 20-15 as a response message thereof in operation 20-110. The RAN 20-15 uses most significant 256 (128) bits of EMSK generated at this time as a gNB key. The RAN 20-15 may transmit an EAP success message indicating normal authentication with the UE 20-10 (EAP success) and inducing the gNB key to the UE 20-10 in operation 20-120. When receiving the EAP success, like the RAN 20-15, the UE 20-10 may use most significant 256 (128) bits of EMSK as the gNB key.

For future NAS communication, the UE 20-10 may perform authentication between a core network and the UE in operation 20-130.

The UE 20-10 may verify whether the RAN certificate, which was temporarily authenticated, is revoked after the NAS communication. The UE 20-10 may transmit a CRL request message ((CRL-req) for the RAN certificate to the UEM 20-20 in operation 20-140. The UDM 20-20 may identify the CRL request message ((CRL-req) received from the UE 20-10 and transmit CRL information for the RAN certificate requested by the UE 20-10 to the UE 20-10 in operation 20-160.

Thereafter, the UE 20-10 may identify whether there is the RAN certificate included in the authentication request message of the RAN 20-15 in the CRL and identify whether the RAN certificate is a legal certificate in operation 20-160.

According to an embodiment, the RAN 20-15 may transmit a CRL request message ((CRL-req) for the UE certificate to the UEM 20-20. The UDM 20-20 may identify the CRL request message (CRL-Req) for the UE certificate and transmit the CRL information for the UE certificate requested by the RAN 20-15 to the RAN 20-15.

FIGS. 21A and 21B illustrate the procedure in which validity of the certificate is identified when the UE and the RAN perform PKI-based authentication according to another embodiment of the disclosure.

In the embodiment of FIGS. 21A and 21B, during the mutual authentication process, a UE 21-10 needs to identify whether a certificate of a corresponding RAN 21-15 is revoked through an online certificate status protocol (OCSP). However, since the UE 21-10 cannot perform communication and thus cannot make a request for the OCSP to the CA, the UE 21-10 may temporarily identify only the RAN certificate and verify whether the RAN certificate is revoked after NAS authentication ends in the future.

In the embodiment illustrated in FIGS. 21A and 21B, the UE 21-10 and UDM 21-20 directly transmit and receive OSCP request/response messages in operations 21-140 to 21-150 after temporary mutual authentication between the UE 21-10 and the RAN 21-15.

The UE 21-10 may first transmit an authentication request message including its own 6G identifier to the RAN 21-15 to access the RAN 21-15 in operation 21-30.

After receiving the authentication request message from the UE 21-10, the RAN 21-15 may transmit a message (Auth-Req.) making a request for authenticating EAP-TLS (TLS start) for the RAN 21-15 to the UE 21-10 in operation 21-40. The RAN 21-15 may insert a 6G key set identifier (6G_KSI) corresponding to an identifier of the corresponding authentication and an anti-bidding down between architectures (ABBA) parameter for preventing bidding down of a security feature from higher release to lower release into the authentication request message (Auth-Req) and transmit the authentication request message to the UE 21-10 in operation 21-40.

When receiving the TLS start information from the RAN 21-15, the UE 21-10 may transmit an authentication response message (Auth-Resp.) including TLS client_hello information to the RAN 21-15 in operation 21-50.

When receiving the TLS client_hello information included in the authentication response message (Auth-Resp.) from the UE 21-10, the RAN 21-15 may transmit an authentication request message (Auth-Req.) including at least one of TLS RAN_hello, TLS Certificate (RAN certificate), TLS RAN_key_exchange, TLS certificate_request (whether a UE certificate is requested), TLS RAN_hello_done information, 6G KSI, and the ABBA parameter to the UE 21-10 in operation 21-60.

At this time, unless a TLC emergency call is used, the RAN 21-15 may set certificate_request and verify a UE certificate. The UE 21-10 should verify the RAN certificate included in the authentication request message of the RAN 21-15.

Even though the RAN certificate is legally signed by the CA, the RAN certificate may be revoked thereafter, so that the UE 21-10 needs confirmation for revocation of the RAN certificate. Accordingly, the UE 21-10 should receive the OSCP indicating in real time whether the corresponding RAN certificate is revoked from the CA included in the content of the certificate or a server designated for verifying the certificate by the CA.

However, since the UE 21-10 has not yet been authenticated and thus cannot perform both AS and NAS communication, the UE 21-10 may temporarily perform authentication with only the RAN certificate without verifying whether the certificate is revoked in operation 21-70.

After identifying that there is no error in the certificate of the RAN 21-15, the UE 21-10 may transmit an authentication response message including at least one of TLS Certificate (UE certificate), TLS client_key_exchange, TLS certificate_verify, TLS change_cipher_spec (available chipper spec information), and TLS finish information to the RAN 21-15 in response to the identification in operation 21-80.

The RAN 21-15 receives the certificate of the UE 21-10 and identifies the certificate of the UE 21-10 in operation 21-90. The RAN 21-15 may identify the certificate of the UE, select an appropriate one of the cipher specs transmitted by the UE 21-10, specify the same in TLS change_cipher- _spec, and transmit an authentication request message (Auth-Req.) including TLS finished information to the UE 21-10 in operation 20-100. The authentication response message may include 6G KSI and ABBA information in operation 21-100.

The UE 21-10 may transmit an empty Auth-Resp message to the RAN 21-15 as a response message thereof in operation 21-110. The RAN 21-15 uses most significant 256 (128) bits of EMSK generated at this time as a gNB key.

The RAN 21-15 may transmit an EAP success message indicating normal authentication with the UE 21-10 and inducing the gNB key to the UE 21-10 in operation 21-120. When receiving the EAP success, like the RAN 21-15, the UE 21-10 may use most significant 256 (128) bits of EMSK as the gNB key.

For future NAS communication, the UE 21-10 may perform authentication between a core network and the UE in operation 21-130. The UE 21-10 may verify whether the certificate, which was temporarily authenticated, is revoked after the NAS communication. To this end, the UE 21-10 may transmit an OSCP request message (OCSP-req) to the UDM 21-20 in operation 21-140. The UDM 21-20 may identify the OSCP request message (OCSP-Req) received from the UE 21-10 and transmit an OSCP response message (OCSP-Resp) including OCSP information requested by the UE 21-10 to the UE 21-10 in operation 21-150.

The UE 21-10 identifies whether the certificate of the RAN 21-15 is revoked on the basis of the OSCP response message and identifies whether the RAN certificate is a legal certificate in operation 21-160.

According to an embodiment, the RAN 21-15 may transmit an OSCP request message (OSCP-req) for the UE certificate to the UEM 21-20. The UDM 21-20 may identify the OSCP request message (OSCP-Req) for the UE certificate and transmit OSCP information for the UE certificate requested by the RAN 21-15 to the RAN 21-15.

FIG. 22 is a block diagram illustrating apparatuses of a UE and a RAN according to an embodiment of the disclosure.

According to FIG. 22, a UE 22-100 includes a transceiver 22-110, a controller 22-120, and a storage unit 22-130. However, elements of the UE 22-100 are not limited to the above-described examples, and the UE 22-100 may include, for example, more or fewer elements than the illustrated elements. In addition, the transceiver 22-110, the storage unit 22-130, and the controller 22-120 may be implemented in the form of one chip.

The transceiver 22-110 may transmit and receive signals to and from the RAN 22-140. The signals may include control information and data. To this end, the transceiver 22-110 may include an RF transmitter for up-converting and amplifying a frequency of a transmitted signal and an RF receiver for low-noise amplifying a received signal and down-converting a frequency. However, this is only an embodiment of the transceiver 22-110, and elements of the transceiver 22-110 are not limited to the RF transmitter and the RF receiver. Further, the transceiver 22-110 may receive a signal through a radio channel, output the signal to the controller 22-120, and transmit the signal output from the controller 22-120 through a radio channel. In addition, the transceiver 22-110 may separately include an RF transceivers for a first radio communication technology and an RF transceiver for a second radio communication technology, and one transceiver may perform physical layer processing according to the first radio communication technology and the second radio communication technology.

The storage unit 22-130 may store programs and data required for the operation of the UE 22-100. Further, the storage unit 22-130 may store control information or data included in a signal transmitted and received by the UE 22-100. The storage unit 22-130 may be configured by storage media such as ROM, RAM, hard disc, CD-ROM, and DVD or a combination of the storage media. The number of storage units 22-130 may be plural.

The controller 22-120 may control a series of processes to allow the UE 22-100 to operate according to the embodiments of the disclosure. For example, the controller 22-120 may calculate and determine information received from the RAN 22-140 through the transceiver 22-110. The number of controllers 22-120 may be plural and the controller 22-120 may perform the operation of controlling the elements of the UE 22-100 by executing programs stored in the storage unit 22-130.

The RAN 22-140 includes a transceiver 22-150, a controller 22-160, a connector 22-170, and a storage unit 22-180. However, elements of the RAN 22-140 are not limited to the above-described examples, and the RAN 22-150 may include, for example, more or fewer elements than the illustrated elements. In addition, the transceiver 22-150, the storage unit 22-180, and the controller 22-160 may be implemented in the form of one chip.

The transceiver 22-150 may transmit and receive signals to and from the UE 22-100. The signals may include control information and data. To this end, the transceiver 22-150 may include an RF transmitter for up-converting and amplifying a frequency of a transmitted signal and an RF receiver for low-noise amplifying a received signal and down-converting a frequency. However, this is only an embodiment of the transceiver 22-150, and elements of the transceiver 22-150 are not limited to the RF transmitter and the RF receiver. Further, the transceiver 22-150 may receive a signal through a radio channel, output the signal to the controller 22-160, and transmit the signal output from the controller 22-160 through a radio channel.

The controller 22-160 may control a series of processes to allow the RAN 22-140 to operate according to the embodiments of the disclosure. For example, the controller 22-160 may generate information to be transmitted to the UE 22-100 and transmit the same to the UE 22-100 through the transceiver 22-150. The number of controllers 22-160 may be plural and the controller 22-160 may perform the operation of controlling the elements of the RAN 22-140 by executing programs stored in the storage unit 22-180.

The storage unit 22-180 may store programs and data required for the operation of the RAN. Further, the storage unit 22-180 may store control information and data included in signals transmitted and received by the RAN. The storage unit 22-180 may be configured by storage media such as a ROM, a RAM, a hard disc, a CD-ROM, and a DVD or a combination of the storage media. The number of storage units 22-140 may be plural.

The connector 22-170 is a device for connecting the RAN 22-140 and a core network and may perform an operation for transmitting a message to physical layer processing for message transmission and reception and the core network and receiving a message from the core network.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method of operating a serving base station (BS) for mutual authentication of an access stratum (AS) section in case that handover is performed in a wireless communication system, the method comprising:

receiving a measurement report from a user equipment (UE);

identifying whether the UE satisfies a handover condition, based on the measurement report;

in case that the UE satisfies the handover condition, identifying whether a target BS connected for handover of the UE belongs to a same authentication area (AA) as that of the serving BS;

transmitting, to the UE, a handover command including inter-AA handover information or intra-AA handover information depending on whether the target BS and the serving BS belong to the same AA, wherein the inter-AA handover information is transmitted in case that the target BS and the serving BS do not belong to the same AA, and wherein the intra-AA handover information is transmitted in case that the target BS and the serving BS belong to the same AA; and transmitting, to the target BS, a public key infrastructure (PKI)-based authentication packet in case that a PKI-based mutual authentication between the UE and the target BS is completed based on the inter-AA handover information.

2. The method of claim 1, wherein the PKI-based mutual authentication between the UE and the target BS is not performed and a key update procedure for the target BS is performed by the UE in case that the intra-AA handover information is transmitted.

3. The method of claim 1, wherein the AA is a set of cells served by a physically or logically same computing node.

4. The method of claim 3, wherein the same computing node is a logically or physically equal computing node, the logically same computing node is implemented as software of a same operator, software having an same right, or software performing an same process, and the physically same computing node is implemented as hardware of a same operator, hardware having an same right, or an same hardware component.

5. The method of claim 2, wherein, in case that the inter-AA handover information is received, the UE and the serving BS detach from each other and then the PKI-based mutual authentication between the UE and the target BS is performed.

6. The method of claim 2, wherein the serving BS transmits a PKI-based authentication packet to a network entity, and the PKI-based authentication packet is transferred to the target BS by the network entity.

7. A method of operating a user equipment (UE) for mutual authentication of an access stratum (AS) section in case that handover is performed in a wireless communication system, the method comprising:

receiving, from a serving BS for the UE, a handover command including inter-authentication area (AA) handover information or intra-AA handover information depending on whether a target BS for the UE and the serving BS belong to a same AA, wherein the inter-AA handover information is received in case that the target BS and the serving BS do not belong to the same AA, and the intra-AA handover information is received in case that the target BS and the serving BS belong to the same AA; and performing public key infrastructure (PKI)-based mutual authentication with the target BS based on the inter-AA handover information.

8. The method of claim 7, wherein the PKI-based mutual authentication between the UE and the target BS is not performed and a key update procedure for the target BS is performed by the UE in case that the intra-AA handover information is received.

9. The method of claim 7, wherein the AA is a set of cells served by a physically or logically same computing node.

10. The method of claim 8, wherein, in case that the inter-AA handover information is received, the UE detaches from the serving BS and then performs the PKI-based mutual authentication with the target BS.

11. A serving base station (BS) supporting mutual authentication of an access stratum (AS) section in case that handover is performed in a wireless communication system, the BS comprising:

a transceiver; and a controller connected to the transceiver and configured to control the transceiver and perform control to:

receive a measurement report from a user equipment (UE), identify whether the UE satisfies the handover condition, based on the measurement report, in case that the UE satisfies the handover condition, identify whether a target BS connected for handover of the UE belongs to a same authentication area (AA) as that of the serving BS, transmit, to the UE, a handover command including inter-AA handover information or intra-AA handover information depending on whether the target BS and the serving BS belong to the same AA, wherein the inter-AA handover information is transmitted in case that the target BS and the serving BS do not belong to the same AA, and wherein the intra-AA handover information is transmitted in case that the target BS and the serving BS belong to the same AA, and transmit, to the target BS, a public key infrastructure (PKI)-based authentication packet in case that a PKI-based mutual authentication between the UE and the target BS is completed based oin the inter-AA handover information.

12. A user equipment (UE) for mutual authentication of an access stratum (AS) section in case that handover is performed in a wireless communication system, the UE comprising:

a transceiver; and a controller connected to the transceiver and configured to control the transceiver and perform control to:

receive, from a serving BS, a handover command including inter-authentication area (AA) handover information or intra-AA handover information depending on whether a target BS for the UE and the serving BS belong to a same AA, wherein the inter-AA handover information is received in case that the target BS and the serving BS do not belong to the same AA, and wherein the intra-AA handover information is received in case that the target BS and the serving BS belong to the same AA, and perform public key infrastructure (PKI)-based mutual authentication with the target BS, based on the inter-AA handover information.

\* \* \* \* \*